US012552193B2

(12) United States Patent
Troxler et al.

(10) Patent No.: US 12,552,193 B2
(45) Date of Patent: Feb. 17, 2026

(54) DYNAMIC CHANGE OF GANG RUN

(71) Applicant: Mueller Martini Holding AG, Hergiswil (CH)

(72) Inventors: Christian Troxler, Rain (CH); Heinz Oberholzer, Oftringen (CH)

(73) Assignee: MUELLER MARTINI HOLDING AG, Hergiswil (CH)

( * ) Notice: Subject to any disclaimer, the term of this patent is extended or adjusted under 35 U.S.C. 154(b) by 9 days.

(21) Appl. No.: 18/461,524

(22) Filed: Sep. 6, 2023

(65) Prior Publication Data

US 2024/0092110 A1 Mar. 21, 2024

(30) Foreign Application Priority Data

Sep. 21, 2022 (DE) ......................... 102022124182.3

(51) Int. Cl.
*B65H 45/18* (2006.01)
*B42C 19/04* (2006.01)
*B42C 19/08* (2006.01)

(52) U.S. Cl.
CPC .............. *B42C 19/04* (2013.01); *B42C 19/08* (2013.01)

(58) Field of Classification Search
CPC ........... B42C 1/12; B42C 19/04; B42C 19/06; B42C 19/08; B65H 45/18; B65H 2301/17; B65H 2301/4461; B65H 2406/122; B65H 2511/11; B65H 2511/20
USPC ................................................ 270/37, 52.07
See application file for complete search history.

(56) References Cited

U.S. PATENT DOCUMENTS

| | | | | |
|---|---|---|---|---|
| 8,505,897 B2 * | 8/2013 | McIntyre | B65H 45/30 | 270/58.08 |
| 9,708,150 B2 * | 7/2017 | Braschoss | B65H 45/12 | |
| 2014/0117608 A1 | 5/2014 | Braschoss et al. | | |

FOREIGN PATENT DOCUMENTS

| | | |
|---|---|---|
| DE | 29716987 U1 | 11/1997 |
| DE | 102008033184 A1 | 3/2010 |
| DE | 102014222319 A1 | 5/2016 |
| EP | 2727868 A1 | 5/2014 |
| EP | 2818331 A2 | 12/2014 |

* cited by examiner

*Primary Examiner* — Leslie A Nicholson, III
(74) *Attorney, Agent, or Firm* — LEYDIG, VOIT & MAYER, LTD.

(57) ABSTRACT

A method operates a facility, which serves for the continuous production of multiple gang runs for forming individual signatures or signature packs from which type-specific print products are made in a downstream print further processing machine. An endless web is the basis for the formation of these multiple gang runs. The endless web, in the non-folded state, is imparted complementary handling by facility-internal means according to the following criteria: i) in a 2-gang run, the individual signatures or the folded signature packs are only deflected in a second longitudinal air folding station disposed downstream of the first longitudinal air folding station; and ii) in a 3 or 4-gang run, the individual signatures or the folded signature packs are additionally folded in a second longitudinal air folding station disposed downstream of the first longitudinal air folding station.

44 Claims, 9 Drawing Sheets

DYNAMIC CHANGE OF GANG RUN

CROSS REFERENCE TO RELATED APPLICATIONS

This application claims benefit to German Patent Application No. DE 102022124182.3, filed on Sep. 21, 2022, which is hereby incorporated by reference herein.

FIELD

The present disclosure is directed to the dynamic changing of a gang run in a printing process.

BACKGROUND

The change of a gang run, also referred to as format change in industry, forms the facility-specific preliminary stage in a production facility when it is a priority to establish production type variability, type-specific finishing of print products in the ongoing operation, and implies that the number of gang runs on a paper web or printed medium parallel or transversely to the running direction is laid down in such a way that the final purpose of securing a wide product type variability can thus be reliably established.

In the digital production of book blocks, so-called smart factories, which ensure the production of individual books of runs of as little as one are on the way up, irrespective of their content, number of pages, or final format. This trend can be clearly observed in recent years and will definitely gain momentum in the future by virtue of the social evolution. The objective is a practically fully-automatic production of a book-of-one, which commences with the uploading of a processable PDF format and extends right up to the ready-for-dispatch book.

In these highly-automated facilities, the paper web widths of the raw web that can be used by the customer will in most instances lead to a limitation, and the final formats desired by the customers are then determined by a change in the number of gang runs, the length of a portion and the final cutting. The rapid change of a gang run, ideally without waste, is of great importance here because this change of the gang run ensures the ideally optimal utilization of the available printable paper web width and thus permits little final cutting. The rapid change of a gang run as the last building block for operating a digitally based facility thus makes it possible to efficiently process the desired final formats without prior sorting of the job data.

Fully automatic gang-run changes from the company of the applicant have been known in various forms. To this end, the relevant publications relating to the prior art will be acknowledged for improved understanding of the subject matter of the disclosure.

A device and a method for longitudinally or transversely folding printing sheets, which have been sequentially printed by means of a digital printing machine, are disclosed in EP2727868 A1. The device here has, in each case, a compressed air installation, which is connected to a compressed air source and a control unit, and has at least one outlet opening for compressed air. In this way, a compressed air pulse of the compressed air installation that conveys the printing sheet from an infeed plane between the folding rollers can be metered in a simple and rapid manner according to the properties of a printing sheet to be currently folded so that a positive folding quality, as well as a high folding output, are able to be achieved across the entire spectrum of printing sheets to be folded. In the case of a printing sheet that does not meet the quality requirements, the compressed air pulse can be selectively suppressed. Thereafter, this printing sheet is not fed to the folding rollers, therefore not folded, and ejected on a separate conveying path.

With such a device, the transport speed of a printing sheet, which in the meantime has been severed from the material web, or else of a printing sheet, which has been individually printed in the digital printing machine, can be decreased by single or multiple transverse folding. To this end, the gap, created during transverse folding, between successive printing sheets can be reduced. Moreover, the gap is enlarged by the ejection of faulty printing sheets.

In this way, this device permits only the production of a product stream of folded printing sheets. While transverse folding does indeed facilitate a gentle further processing of the printing sheets, it does potentially lead to an undesirable, higher number of empty pages at the same number of folding operations. In contrast, it is known to minimize the number of empty pages in a printed product by integrating non-folded printing sheets. However, neither the known device nor the known method are capable of integrating non-folded printing sheets into the product stream. Moreover, the use of non-folded printing sheets increases the cycle rate, which—depending on the further processing devices used—results in a high transport speed and in turn can impede gentle further processing and may lead to quality issues.

A further device and method for folding printing sheets with a compressed air installation are disclosed in EP2727869 A1, which compressed air installation is connected to a compressed air source and to a control unit and has at least one outlet opening for compressed air that is directed onto the folding gap of the folding rollers. The compressed air installation has at least two segments, in each case at least one segment which is provided with a cross-sectional area, wherein each segment is connected to the compressed air source and the control unit, the latter being equipped with at least one control element which is separately actuatable by compressed air.

It is indeed correct that as a result of the compressed air installation being segmented, at least two regions of the device, which are disposed next to and behind one another in the infeed direction, can be impinged individually with compressed air. However, this device thus only permits the production of a product stream of folded printing sheets. While transverse folding does indeed facilitate a gentle further processing of the printing sheets, it does potentially lead to an undesirable, higher number of empty pages at the same number of folding operations. In contrast, it is known to minimize the number of empty pages in a printed product by integrating non-folded printing sheets. However, neither the known device nor the known method are capable of integrating non-folded printing sheets into the product stream. Moreover, the use of non-folded printing sheets increases the cycle rate, which—depending on the further processing devices used—results in a high transport speed and in turn can impede gentle further processing and may lead to quality issues.

A device and a method for the further processing of a paper web which has been sequentially printed by a digital printing machine are disclosed in EP2818331 A2. The printed paper web initially passes through a perforating and cutting station. The printing sheets severed in the latter are in each case folded individually once or multiple times by transverse and longitudinal folding installations. After folding, the printing sheets, which later form a common partial book block are combined in a collating installation in an imbricated manner before they are stacked to form a partial book block and glued in an adjoining stacking installation. Thereafter, the partial book blocks are transported to further processing. In order to minimize the number of empty pages, the folded printing sheets can also be combined with a non-folded printing sheet. However, this non-folded printing sheet has at all times to be fed in at the end of a print product to be formed, i.e. after the folded printing sheets. The buckle plate folding mechanism usually used here mandatorily requires a gap between a folded and a non-folded printing sheet in order for a mechanical flap to be activated, the latter deflecting an individual printing sheet through the folding rollers without being folded, instead of into the folding pocket for folding. The switching of this flap requires, in each case, a specific time, i.e. a corresponding gap depending on the transport speed. Such a gap can be generated by a stop-and-go operation, for example. This gap increases the higher the transport speed and the shorter the cutting length of the printing sheet, and consequently the higher the cycle rate. The time required for switching the flap can indeed be minimized but not eliminated by using the latest drive technology.

In such a solution, a certain reduction in the number of empty pages can be achieved by virtue of an optimization of folding patterns depending on the number of gang runs, said optimization being performed automatically according to the respective production orders in the machine control unit. However, the costs, the space requirement as well as the complexity in terms of control and feedback control are relatively high due to the number of handling stations. Depending on the operating mode, the transport speed of the printing sheets which after severing have to be transported in succession, initially individually and at a very minor spacing, through the device is also relatively high so that quality issues may arise in the further processing of said printing sheets. Moreover, the paper web is briefly stopped in the cross cutter which is disposed upstream of a buckle plate folder that is used for transverse folding, this leading to a discontinuous operation and to the use of a relatively complex, upstream accumulator section. Finally, the transport path is cleared only once the preceding printing sheet has been conveyed out of the buckle plate folder after being folded.

EP3002240 A1 discloses a printing sheet brake, the displacement of which serves for decelerating and positioning a printing sheet provided by a printing machine in a processing machine, wherein at least one means which exerts a braking force effect on the printing sheet and in this way implements the positioning of the latter in connection with a downstream processing station is present along the feeding direction of the printing sheet.

EP3533609 A1 discloses a device and a method for the further processing of successive, sequentially printed printing sheets, having a conveyor, a folding table, a folding blade, a pair of folding rollers, at least one holding-down device, as well as a machine control unit which is operatively connected to the folding blade and the holding-down device. The holding-down device possesses at least one mechanical braking element for the printing sheet which acts in the region of the rear edge on the top side of this printing sheet to be positioned on the folding table. The stationary folding blade possesses a compressed air installation which is connected to a first compressed air source and has at least one outlet opening for compressed air, which outlet opening is directed onto the folding roller gap. The folding table forms a combination installation for at least two mutually successive printing sheets. A sensor for detecting the printing sheets transported by the conveyor, which is operatively connected to the machine control unit, is disposed in the region of the conveyor.

During the operation of the device, the front edge of a succeeding printing sheet is fed so as to be elevated in relation to the rear edge of the printing sheet positioned on the folding table. This can be achieved by a fixed or adjustable step, by an active element or a ramp, in the lower belt which in each case lifts the front edge of the succeeding printing sheet in relation to the rear edge of the printing sheet positioned on the folding table. Once a number of printing sheets that corresponds to the current job order is combined on the folding table that forms the collection installation, i.e. said printing sheets have been deposited on top of one another so as to form a stack, this stack by means of the folding blade and the pair of folding rollers is subsequently folded, and a folded print product is produced in this way.

EP3597430 A1 discloses a device and a method for the selective transverse folding of successive, sequentially printed printing sheets. A compressed air installation of the device, which is used, possesses a first control element for triggering or suppressing a compressed air pulse from the at least one outlet opening of the compressed air installation, said control element being connected to the control unit. In this way, a printing sheet can either be directed into the second transport section for folding, or into the third transport section for bypassing folding. The latter, while incorporating a common second section point, downstream of the folding rollers, opens into the second transport section, wherein the latter is adjoined by a fourth transport section downstream of this profile. In this respect, the third transport section is considered to be longer than the second transport section or, by the same token, to be able to be operated more slowly than the second transport section, in such a way that a first sequence of the successive printing sheets on the first transport section is the same as a second sequence of the successive printing sheets on the fourth transport section.

Accordingly, printing sheets which have been sequentially printed by means of digital printing machines can be further processed selectively when transversely folded as well as not folded, so that the production of a print product consisting of transversely folded first printing sheets and non-folded second printing sheets, and thus also a reduction in the number of empty pages in the completed print product, is made possible. The non-folded second printing sheet can be inserted in the gap, the latter having been created by bypassing transverse folding, after the transversely folded first printing sheet and so as to be spaced apart from the latter, while maintaining or re-establishing the original sequence. In addition to triggering or suppressing a compressed air pulse, the duration of impingement of a printing sheet provided in a folding position with compressed air can also be varied by the first control element. Since the printing sheets can be fed to the device almost without any gap, the transport speed can be operated constantly or approximately constantly.

EP2145773 A1 discloses a method and a device for producing multi-sheet, folded printed products, in particular periodicals and brochures. By generating a material web printed in a digital printing station, said material web has at least three printed material web portions which are disposed next to one another in their longitudinal direction in such a manner that, in the material web moved in an advancing direction, a first material web strand is formed by at least one printed material web portion. The latter is converged with a second material web strand which is formed by two printed material web portions, and by means of an adhesive is connected to the second material web strand along a connection line that runs in the longitudinal direction of the material web.

Sub-products, which consist of a first printed sheet, which is severed from the first material web strand, and of a second printed sheet, which is severed from a second material web strand connected to said first material web strand, the printed sheets subsequently being stacked to form a stack, are severed from the interconnected material web strands by cutting transversely with respect to the advancing direction of the material web. The sub-products are connected to one another during stacking or after stacking, and the sub-products are folded individually or as a stack about a fold line which runs between the printed portions of the second sheet that lie next to one another.

During stacking, the sub-products by means of an adhesive can be connected to one another in the region of the fold line so as to form a stack. The amount of waste can indeed be minimized by this operating system, but limitations in terms of the web speed have to be taken into account when planning. Furthermore, changes in the gang run from a 2 to 3-gang run, but not to 4-gang runs, can thus be implemented.

SUMMARY

In an embodiment, the present disclosure provides a method for operating a facility which serves for continuously producing multiple gang runs for forming individual signatures or signature packs, from which type-specific print products can be made in a downstream print further processing machine, an endless web being used as a basis for forming the multiple gang runs, the endless web in a non-folded state being imparted complementary handling by facility-internal means before the endless web is fed to a cutting operation, which operates transversely to a running direction and by which a specified or variable cutting length forming a single sheet is provided in such a manner that cutting lengths by way of a conveying apparatus are transported while maintaining a specified or continuously re-established mutual spacing a transfer section operable so as to correspond to the cutting length being present downstream of the conveying apparatus. The cutting lengths downstream of this braking apparatus, by way of at least one longitudinal air folding station or a mechanically operatable folding station, are handled so as to form folded individual signatures or pre-assembled and folded signature packs and are fed to an alignment section for implementing the following handling operations: a) after the transfer of the product, an alignment of the folded individual signatures or folded signature packs in a 2-gang run is carried out for implementing auxiliary gluing in the downstream collation process; b) after the transfer of the product, an alignment of the folded individual signatures or folded signature packs in a 3 or 4-gang run is carried out for the folding in a second longitudinal air folding station and auxiliary gluing in the downstream collation process; c) in a 2-gang run, the individual signatures or the folded signature packs are only deflected in a second longitudinal air folding station disposed downstream of the first longitudinal air folding station; d) in a 3 or 4-gang run, the individual signatures or the folded signature packs are additionally folded in a second longitudinal air folding station disposed downstream of the first longitudinal air folding station.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
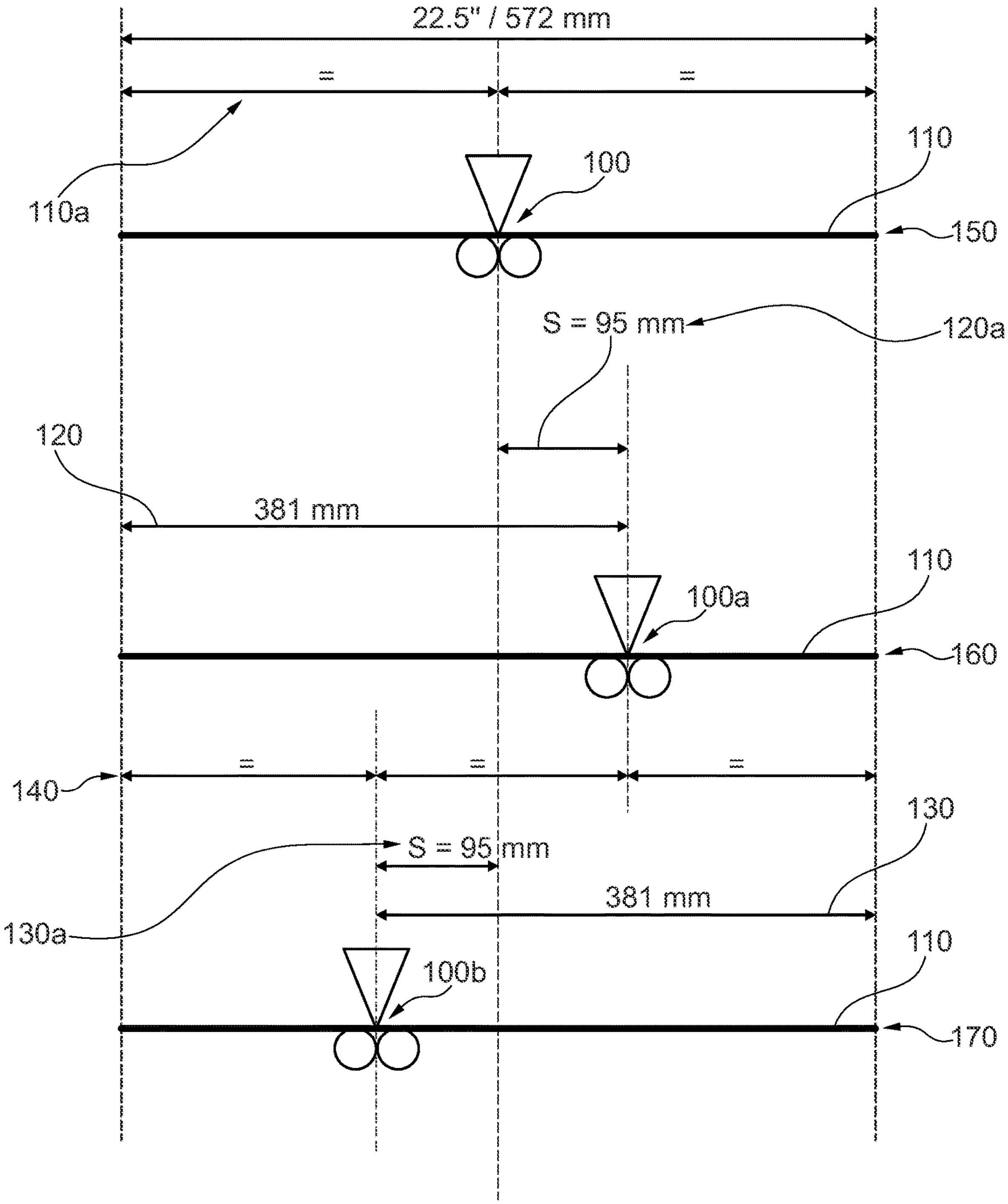
FIG. 1 shows the general formation of the folding widths, proceeding from a typically paper web width of 22.5"

The present disclosure provides a method and a facility for a fully-automatic change of gang run mutating at least from a 2, 3, 4-gang run (number of page patterns imprinted parallel or transversely to the running direction on a paper web or printable medium), which facility can be operated at an ideally high web speed of preferably >500 fpm (=>≈152.4 m/min) while at the same time generating ideally little changeover waste, wherein the web speeds are very variable depending on the type of process and the final purpose. Additionally, the disclosure has a small footprint, which is easy to operate and leads to favorable production costs in terms of the print products produced. The facility according to the disclosure is to be used primarily in the so-called narrow-web printing fields at paper web widths of up to approx. 22.5", because most of the printing machines are used in the field mentioned. However, this does not preclude that wider paper webs may be processed.

According to the disclosure, this is based on an interaction of technologies which are used in a targeted manner and which lead to a variable-format and production type-specific production of print products proceeding from the underlying signatures, signature packs, individual sheets, folding diagrams and fold types which form the initial basis for the production at least of softcovers (SC) and variants thereof, hardcovers (HC) and variants thereof, products from saddle stitching (SH) and thread binding (FH) as well as the production of complete fold-glued brochures in a single facility or print further processing machine. In terms of the more detailed physical design of these book blocks of different manufacture, reference is made to the explanations given below.

The changeovers between the different production methods can take place in a practically seamless manner and without machine stoppages or empty cycles, this enabling the orders to be processed so as to be fit for postage and/or meet customer-specific requirements. Likewise, the print products thus established can be fed downstream, in-line and seamlessly to the further processing steps. Such a combination of machines so as to form a fully automated smart factory handling the digital PDF to the complete finished product proves to be particularly efficient and future-oriented.

In terms of the changeover waste it is noted for the benefit of general understanding that a change of gang run in such a high-performance facility is highly desirable, and that the changeover procedures do not have to be changed for each individual book, as is the case in a fully variable "book-of-one", but in most instances only once pre-collected production outputs with identical gang run have been processed. The changeover procedures can be performed at the full running speed, but up to 70 m of blank paper is produced depending on the changeover. In comparison to the waste of approx. 150 m during start-up of the printing machine, this waste per se is relatively minor but still excessive in terms of the requirements in the "book-of-one" and in particular in the case of pre-printed rolls.

Provided according to the disclosure is a method for rapidly changing gang runs and production types, by way of which lower production costs are thus also incurred, in which the first longitudinal fold, nowadays implemented as a former fold in the endless web, is transferred to the LAF1 (length air fold 1). The second longitudinal fold, for the purpose of producing a 3-gang run or a 4-gang run, is newly transferred to a second longitudinal fold LAF2 (length air fold 2).

In this context, the possibility of an upstream funnel for wide paper webs is pointed out, as a result of which the process in terms of the handling of gang runs can be upgraded to the gang run count of typically 4 to 8 gang runs. For the avoidance of unnecessary repetitions, reference is made to this end to the scope of protection of this description rather to a plurality of descriptions.

This means that the endless web, which now is newly not folded, can be fed directly to the cross cutter. Here, the endless web is transferred to the cross cutter by way of a web tension, upstream of said cross cutter, that is feedback-controlled by the tension roller(s), either from an unwinding station (offline) or from a printing machine (inline). Prior to cross cutting, the corresponding longitudinal perforations are additionally added automatically and in a precise signature-specific manner according to the gang run, so that the endless web can be perforated. The paper web is subsequently cut transversely to the running direction to a predefined cutting length. The sheet parts thus created are acquired by a sheet transport unit and subsequently picked while operatively connected to a gap with a time constant (typically approx. 20 ms), wherein this here is an exemplary time variable as initially established at the outset. This time constant is a function of the sheet braking function in the LAF, which is derived in detail from EP 3 002 240 A1, this publication forming an integral part of this application. Accordingly, said gap of typically 20 ms fulfills two functions, specifically ensuring the reliable discharge of the sheet parts at the turnout at high cycle rates (>40,000 c/h), on the one hand, and sustainably ensuring the operating mode of the sheet brake, on the other hand.

The sheet part is subsequently guided onward in the direction of LAF1 and in the latter either individually folded, as is derived in detail from EP 2 727 869 A1, this publication forming an integral part of this application, or is pre-collected and folded, as is derived in detail from EP 3 533 609 A1, this publication also forming an integral part of this application. Subsequently, the folded individual signatures or pre-collected and folded signature packs are guided in the direction of the alignment section. According to the disclosure, the alignment section here fulfills additional functions, or else arbitrary combinations thereof:

1. Alignment of the folded individual signatures or folded signature packs in the 2-gang run, for the purpose of applying precise auxiliary gluing in the downstream collation process.
2. Alignment of the folded individual signature or folded signature packs in the 3 and 4-gang run for the precise folding in the second fold, thus in LAF2, and for the precise attachment of the auxiliary gluing in the downstream collation process.

In terms of the alignment section, the functions 1 and 2 can be operated not only individually but they can also be carried out partially or completely in combination with one another.

As a result of the disposal according to the disclosure of longitudinal perforations or fold-softening nozzles and/or scoring wheels, preferably three of each, in the region of the endless web for the purpose of later forming 2, 3 and 4-gang run signatures or signature packs; in terms of the downstream dynamic cross cutter for the formation of individual sheets, a gap formation with a time constant triggered by a sheet-brake timing of approx. 20 ms; and in terms of the positioning of the turnout disposed upstream, the onward transport to the waterfall of the first longitudinal folding element with the folding table, with variable-format folding rollers, and the sheet detent at 90° in relation to the air blade, is performed.

The facility can be operated with or without the sheet brake and preferably includes an air blade for forming individual, folded signatures or signature packs, and for ensuring the downstream onward transport and the product transfer within the alignment section for the purpose of alignment for the second longitudinal fold in the second longitudinal folding element with a variable-format sheet detent and folding rollers, wherein the sheet detent is disposed parallel to the air folding element in such a manner. The facility is operated with sheet guides and an air blade for the purpose of forming the second longitudinal fold within signatures or signature packs with a precise alignment for auxiliary gluing in the downstream collation unit.

At least two longitudinal folding elements with air blade technology are combined with at least three longitudinal perforations to one another, wherein the longitudinal perforation, or the devices of fold-softening nozzle or scoring wheel, are provided via a superordinate control unit and data management and barcode comparison, and are hooked up precisely in a signature-specific manner according to the chosen folding diagram. In a manner corresponding to the folding diagram, a longitudinal perforation (center for a 2-gang run) or two longitudinal perforations (center and selectively left or right for a 3-gang run, left=Z-fold, right=W-fold) or all three (4-gang run) are hooked up by the control unit. In order to specify this situation, it is to be here noted that the disposal of the mentioned longitudinal perforation, with left for Z-fold and right for W-fold, depends on how the second longitudinal fold is implemented. Based on the folding diagram, the intake position of the first longitudinal fold is correspondingly set to the corresponding perforation transversely to the paper web (or to weakening of the paper formed by the position of the fold). The sheet parts in the first longitudinal fold (LAF 1) are then moved onto the folding table by way of the waterfall and by means of the sheet brake decelerated to a precise point on the sheet detent. This then takes place either based on the superordinate data management system or based on barcodes that are disposed in a targeted manner, wherein the sheet parts are then individually folded or first collected and then conjointly folded. Subsequently, the individual signature or the signature pack on the alignment section is aligned transversely to the paper running direction with a fixed edge parallel to the transport direction and, depending on the folding diagram, in the second longitudinal folding unit is then deflected by the folding rollers (2-gang run) or folded once again (3-gang run and 4-gang run). The folding process in the second longitudinal fold is characterized in that the signatures/signature packs impact on the sheet detent so as to be parallel to the air folding unit, and the individual signatures/signature packs are simultaneously pushed in the direction of the folding rollers by a folding air pulse, as a result of which the second longitudinal fold is formed.

An optimized utilization of the web width, which is the basis for the production of type-specific print products, can only be achieved by the method according to the disclosure and the apparatuses thereof for producing 2, 3 and 4-gang runs.

As a result of the signature-specific switching from longitudinal perforation to fold-softening nozzle or scoring wheel, signatures for a normal adhesive binding (HC, SC and modified copies) can be changed over to products of thread binding (FH) or saddle stitch production (closed signature) at full machine running. This means that a changeover to various productions can take place in line, without any or only with minimized changeover procedures, wherein the operation can take place without waste when the changeover of the production type changes are carried out seamlessly at an identical cutting length and with an identical folding diagram. In this context, it is to be emphasized that even further production types such as mailing and jaw fold are additionally possible. It is important to note here that the pre-collection function in the longitudinal fold LAF1 is of fundamental importance in particular because the output of the downstream processes for thread binding and saddle stitching can be increased by factors in this way. Otherwise, the individual signatures would either have to be collated in an intermediate step, or else the operation would have to take place at a cycle rate which would allow an output that would lead to a limited feeding procedure of the apparatuses. In adhesive binding, pre-collecting guarantees primarily the assurance of quality.

The above-mentioned changeover from individually folded signatures to folding pre-collected signature packs from one cycle to the next can be implemented in that the process-relevant parameters, such as, in particular the variable adjustment of the folding rollers as a function of the thickness, and the variation of the folding pressure at the air blade, are controlled based on recipes. If variable-thickness folding rollers are provided, preferably rubber rollers formed by teardrop-shaped recesses, these first of all being able to guarantee a thickness compensation of at least 2 plies of paper without any adjustment of the rotation axes. If there are larger jumps in thickness, measures are taken in order to be able to mechanically adjust the folding rollers in a corresponding manner. In principle, in such process-related procedures, it is possible to supplement the underlying recipe-based control in such a manner that said control profiles can be automatically computed and implemented based on the fundamental items of information, such as folding diagram, type of paper, thickness.

The solution for the rapid and practically seamless changeover of 2, 3, 4-gang runs based on the format-limiting signature widths with a paper web of approximately 22.5" width can of course be upgraded to a 5 to 8-gang run. This means that the paper web is according to the disclosure not restricted to the width of 22.5" preferably used, but wider or else narrower paper webs can also be used, which are fed in, for example, by way of an upstream folding funnel, a plow fold, or a part-web infeed, and which are then converged ahead of the cross cutter.

Here, an 8-gang run is processed in the same way as a 4-gang run, for example, wherein the infed web is a two-ply web in this instance. The downstream process remains identical. One advantage of this solution can be seen in that the page count output/cycle rate is likewise doubled as the width of the paper webs increases, e.g. two-fold. The advantageous solutions according to the disclosure and according to the claims here are not subject to any limitation as is the case in existing solutions in which a two-ply paper web would not work due to the folding principle and having to hold down one half for example by vacuum belts in combination with guide plates. Corresponding systems and the functioning mode thereof are known to the person skilled in the art. The person skilled in the art is aware of the functioning of this system, which is why further explanations are dispensed with.

The following further advantageous variants of embodiment may be listed as an enrichment of the prior art:

A refinement provided by an aspect of the present disclosure lies in that a first means is operated such that the latter effects a pneumatic force on the printing sheet, which pneumatic force is controlled by pulses that trigger a braking force. Furthermore, a second means, which implements at least one frictional force that generates a braking force and acts on the printing sheet intervenes, wherein intermittent, uniform or oscillating braking forces on the printing sheet are generated by the first and/or the second means in such a manner that the braking forces are managed by a control unit which is operated by variable control profiles, either stored or intervening, that are able to be activated based on the retrieved operating parameters.

The advantages derived therefrom can be gathered in summary as follows: In comparison to the conventional solutions, there are no longer any prominent mechanisms at the forefront, as a result of which, deficits from effects of wear and tear are not to be anticipated even at high cycle rates. Proven elements which henceforth rely on air pulses are used, as a result of which special adjustments relating to the paper thicknesses are no longer necessary so that correspondingly operative stability can be achieved. The deceleration to an exact position can be absolutely implemented to a precise point using this mechanism. The operative significance of the disclosed device lies in that the latter can be introduced as a complementary measure into systems which are based on methods for changing the type of production.

According to the disclosure, there is here an advantageous convergence or a combination of advantageous apparatuses and methods which are based on existing technologies such as air folding technology, sheet brake, pre-collection, on the one hand; and upgrades which include the above-explained formation of 2, 3, and 4-gang runs and more according to the disclosure for producing signatures and signature packs, are proposed on the other hand, which in turn guarantee diverse production possibilities and combinations for producing diversely type-specific or similar-type print products downstream while including at least one further print processing machine, specifically:

1. A method and a device for 2, 3, and 4-gang runs for providing signature or signature packs, wherein the production of the latter leads to an optimized utilization of the web width.
2. A method and device for the fully automatic change of gang run of 2/3-gang run, 3/4-gang run, or 2/4-gang run. A changeover of gang run across such a wide range is also able to be carried out in an analogous manner in the reverse direction in terms of the combinations of gang runs covered. The change of gang run from 2/3-gang run and 3/4-gang run can be carried out with waste of a few meters, the latter depending on an adjustment of the intake position LAF 1. The change of gang run from 2/4-gang run however takes place seamlessly because the intake position does not have to be adjusted.

3. The ability to carry out seamless and precise signature-specific changeovers of production type in the same gang run, from perforated signatures to closed signatures for FH, SH and other types of book blocks, can be implemented by an automatic and precise signature-specific changeover from longitudinal perforation to fold-softening nozzle and vice versa. As a result, books in a run of one can be manufactured here seamlessly according to different types of production, i.e. customer-specific requirements in terms of the final type of production of the book block no longer have to be filtered in advance and transferred to separate production lines, assuming that the type of paper remains the same. Accordingly, those parameters by way of which customer orders can be produced fit for postage can be met.
4. A method and a facility for producing W-fold or Z-fold signatures in the 3-gang run as an individual signature or as pre-collected signature packs. This can also be carried out in combination with fold-softening nozzles and/or scoring stations for the purpose of producing closed spines for mailings, advertising products, and much more.
5. In combination with a scoring station, envelopes can also be produced ex-unwinding station, for example with a jaw fold, and subsequently collected in batches in the collation station. The jaw fold is implemented by selecting the folding mode as in the 3-gang run, wherein this, instead of a longitudinal perforation, is predefined by a scoring station and subsequently folded in the LAF1. However, no second fold is formed in the LAF2, but the prefabricated jaw folder sheet is only deflected and subsequently collated.

In a manner analogous to that of No. 5, a double jaw folder (also referred to as a gate fold), which is to be implemented in LAF2 subsequently or alternatively to LAF1, could also additionally be produced in a 4-gang run.

6. A seamless changeover from W-fold to Z-fold at full machine running speed without manual intervention is guaranteed in such a manner that the displacements of the intake position in the LAF1 define the number of meters of waste during the changeover.
7. This is based on a method and a facility for producing a double parallel fold, individual signatures or pre-collected signature packs in the 4-gang run.
8. A change of production type from the production of the book blocks to individual sheets can be established seamlessly by lifting the sheet detent in LAF1 precisely in the cycle and suppressing the folding pulse, and transporting the sheet parts through the LAF1 into a downstream collection or collating installation can be carried out immediately as a result.
9. A method and a facility for producing fold-glued brochures in the 2-gang run by scoring and/or applying fold-softening agents in the fold crease in the region of the endless web, with subsequent cross cutting, sheet transport and gap formation, glue application in the newly proposed pre-scored and/or fold-softened fold crease region, which are neither described in the prior art nor are obvious to the person skilled in the art from the latter. Here, pre-collection in the LAF1 and with subsequent folding is implemented. The onward transport via the alignment section and the deflection in the LAF2 is guaranteed, and a superordinate collation or an output of individual brochures subsequently takes place in the collating machine.
10. Moreover, an upgrade of the gang runs can be implemented with an upstream funnel and a two-ply paper web in such a manner that it is possible to increase the gang runs with the dynamic folding-diagram changeover from a 4 to an 8-gang run.

This variability in terms of the production types described, which serves for producing type-specific or similar-type print products, is presently implemented by the operation of a further downstream print further processing facility or machine, wherein the introduction of the previously generated print products into the facility and running said print products through the facility normally takes place as a function of the job; irrespective thereof, the production can likewise be maintained in the individual operation or the mixed operation, wherein truncations of a specified stream can be implemented at any time by introducing other type-specific print products, right up to a continuous intermittent production of individual print products (book-of-one).

Accordingly, downstream of the formation of 2, 3 and 4-gang run signatures or signature packs described above, and downstream of the following dynamic cutting for the formation of individual sheets, the downstream print further processing is composed at least of one device consisting of an adhesive binder, wherein an endsheet feeder can be integrated as an inventive upgrade, wherein such an endsheet feeder may also operate autonomously outside the adhesive binder. In addition to the adhesive binder for the further print further processing facility, at least one barcode scanner system is provided. If the endsheet feeder is integrated in the adhesive binder, said endsheet feeder is preferably disposed at the head of the adhesive binder in order for said endsheet feeder to be available directly for the production of all type-specific print products. The production of the individual type-specific print products is carried out according to the following criteria:

1) In the production of a first type-specific print product in the form of a hardcover (HC), the specific handling in the adhesive binder lies in that the infed book block is already supplied with an endsheet, the book block then runs through the orderly handling stations in the adhesive binder until the next type-specific handling takes place in a lining station disposed downstream.
2) In the production of a second type-specific print product in the form of a modified hardcover (HC), the specific handling in the adhesive binder lies in that the infed book block is already supplied with an endsheet, the book block then runs through the orderly handling stations in the adhesive binder until the next type-specific handling takes place in a lining station disposed downstream. The print product thus produced can subsequently be upgraded in that the latter in a cover sheet feeder disposed downstream of the lining station is optionally supplemented with a cover sheet, this leading to a further variant of embodiment (2a).
3) In the production of a third type-specific print product in the form of a modified hardcover (HC), the specific handling in the adhesive binder lies in that the infeed book block is supplied without an endsheet, the book block then runs through the orderly handling stations in the adhesive binder until the next type-specific handling takes place in a lining station disposed downstream. The print product thus produced can subsequently be upgraded in that said print product in a cover sheet feeder disposed downstream of the lining station is optionally supplemented with a cover sheet, this leading to a further variant of embodiment (3a).

4) In the production of a fourth type-specific print product in the form of a softcover (SC), the specific handling in the adhesive binder lies in that the book block is supplied without an endsheet, the book block runs through the orderly handling stations in the adhesive binder while bypassing handling in the lining station. The book block downstream of this lining station is equipped with a cover sheet in a cover sheet feeder. Optionally, handling can take place in the lining station, this leading to a further variant of embodiment (4a).

5) In the production of a fifth type-specific print product in the form of a modified softcover (SC), the specific handling in the adhesive binder lies in that the book block is supplied with an endsheet, the book block runs through the orderly handling stations in the adhesive binder while bypassing handling in the lining station. The book block downstream of this lining station is equipped with a cover sheet in a cover sheet feeder. Optionally, handling in the lining station can be included, this leading to a further variant of embodiment (5a).

6) In the production of a sixth type-specific print product with associated variants of embodiment, this is a thread-bound book (FH) which emanates from a thread binding machine and which is then transferred into the print further processing facility for final handling and therein is identified by at least one barcode scanner and is correspondingly transported onward, wherein a first report pertaining to the established type-relevance of this book is sent to the machining station of the adhesive binder, specifically by inputting the command not to perform any handling of the spine of such a book block. Prior thereto, the thread-bound book is optionally handled in an endsheet feeder which is internal to the facility or is able to be autonomously operated, thus equipped with an endsheet or not equipped with the latter. The thread-bound book after introduction into the adhesive binder runs through the machining station without being handled, as has already been mentioned; thereafter, this book is optionally processed in a lining station and/or in a cover sheet feeder (variants of embodiment 6a-6b). It is also possible for such book blocks to be produced on a hardcover machine with available hardcovers, and for said book blocks then to be glued and equipped with a spine lining/insert lining, as required.

In summary, it can therefore be established that at least eight different variants of embodiment of type-specific print products are able to be produced when including the adhesive binder as the basis here, and/or a thread binding machine and/or a hardcover machine and/or a binding machine, wherein the number of variants of embodiment in focus here is not to be considered exhaustive.

7. The production of a seventh type-specific print product is one from a saddle stitcher which has print product-related processing stations which are upgraded with at least one barcode scanner system, the latter being capable of detecting the individual print product-related signatures provided with barcode, of individually designing the processing of the latter in the saddle stitcher, and of carrying out the final finishing in terms of the cover sheet to be attached.

The attachment of the endsheet, the lining strip, the cover sheet in the type-specific print products 1 to 6, with the associated variants of embodiment, is carried out by gluing operations which depend on the type of the books or book blocks present. In the case of products from a saddle stitcher, all conventional and specified types are used in the formation of packs.

The type-specific books or book blocks in the case of a sorted or non-sorted sequence can be processed according to the following criteria when introduced into a print further processing facility:

a) In the case of a sorted sequence of the book blocks introduced into the print further processing machine, the fundamental effective composition of the prevailing sequence is checked at least once by at least one barcode scanner, i.e. it is checked to which job the print products belong, whether these are fundamentally hardcovers (HC) and their variants of embodiment, preferably in the context of above Nos. 1 to 3, or softcovers (SC) and their variants of embodiment, preferably in the context of above Nos. 4 to 5, or thread-bound books (FH) or their variants of embodiment, preferably in the context of above No. 6, or other types of book blocks. Assuming that the individual jobs are introduced into the print further processing machine so as to be presorted in type-specific packs, the operation during the handling sequences of the individual print products of the same type remains unchanged.

b) If a fundamental sorting of the print product is specified, it is checked by at least one further barcode scanner or barcode scanner system, preferably ahead of the entry into the print further processing machine, whether the respective book block within the sequence is present in a uniform manner throughout, or whether individual variants of embodiment derived therefrom are mixed in with the latter. Accordingly, the individual handling sequences along the endsheet feeder, lining strip feeder, cover sheet feeder, are controlled by a central machine control unit based on specific control profiles.

c) In a non-sorted sequence of the book blocks introduced into the print further processing machine, the items of information detected by the barcode scanners travel to a central machine control unit which controls the individual handling sequence, whereby it is readily possible to handle individual type-specific book blocks in an intermittent manner, not only when the latter are fed intermittently or in isolation, but also when there is an embodiment of book blocks that is different in terms of type after each cycle. The same considerations also apply if the manufacture of different, unsorted print products in a saddle stitcher is involved.

d) Accordingly, this means that the mixed operation in the case of type-specific book blocks can be carried out in a reliable process, both in the case of regular or arbitrarily random as well as in the case of arithmetic or geometric sequences, with or without truncations, as has already been set forth above.

The barcode scanner system detects the handling sequences of the facilities required for carrying out the gang runs, as well as those devices or apparatuses of the further processing facility in which the differentiation in terms of the book blocks is detected for the type-specific finishing of the completed products; this is thus primarily the continuous detection and differentiation of the signatures or signature packs within the preceding formation of 2, 3 and 4-gang runs, this detection implying the following dynamic cutting for providing the formation of individual sheets or the provided book blocks. Accordingly, this barcode scanner system is already active in an automatic book block infeed unit which is disposed upstream of the print processing machine; the book block then is directed into the endsheet feeder and subsequently into an adhesive binder or saddle stitcher in which the monitoring, controlling and feedback-controlling of the type-specific products or semi-finish product takes place. Subsequently, the barcode scanner system also extends its services to the dimensional completion of the products in a downstream edge cutting apparatus which is preferably conceived as a three-knife trimmer, by way of which such a barcode scanner system is readily capable of comprehensively controlling and feedback-controlling the highly individualized production of print products within this section.

A similar barcode scanner system is also used as the basis within the preceding formation of 2, 3 and 4-gang run signatures or signature packs, this barcode scanner system functioning according to the same principles. In order for the entire facility to be able to be operated without deficits or interferences from the beginning to the end, the barcode scanners, or the system or the systems communicate with one another or among one another; i.e. there is a uniform or adapted control/feedback control doctrine in which the systems are optionally constructed for interconnectivity.

The barcode scanner systems mentioned preferably operate according to the following principles: i) guaranteed is at least an identification of the detected barcode in the print products; ii) the data in the barcodes are present as encrypted or encoded; iii) the barcode scanner systems are permanently on standby during the handling sequences: this means specifically that endsheet feeders and adhesive binders are continually controlled and feedback-controlled such that softcovers and hardcovers or other types of print products can be processed without delay and individually.

It applies in general that all barcode scanner systems can be upgraded and/or replaced and/or combined with one another by simple markings, or by a RFID system, or by the integration of a workflow system.

As a result of the formation of 2, 3 and 4-gang run signatures or signature packs, and as a result of the downstream dynamic cutting for the formation of individual sheets, the preconditions for providing a wide range of print products which are inherently different are achieved, said print products going beyond the fundamentally configured hardcovers and softcovers; therefore, an infrastructure which is capable of operating with different cover sheets without interfering with the cycle of the facility has to also be made available; under normal circumstances it will not be sufficient to operate with a single cover sheet feeder with assigned cover sheets in such a constellation, so that an operation with a plurality of cover sheet feeders with different cover sheets has to take place in order to maintain a continuous cycle-conforming production of different print products, wherein the cover sheet feeders are controlled by at least one barcode scanner in such a manner that the book block can in each case be equipped with the assigned cover sheet from a cover sheet feeder so that such an operation can be carried out according to the following criteria, for example:

i) at least one barcode scanner system which is disposed upstream of the handling machine, preferably upstream of an adhesive binder, establishes the prevailing sequence in the stream of the book blocks;
ii) this sequence by way of a further barcode scanner system is compared with the sequence of the deposited cover sheets in the individual cover sheet feeders;
iii) in the event of an inconsistency between the next cover sheet able to be called up and the next book block to be fed, an empty intake of cover sheets in the affected cover sheet feeder is initiated;
iv) the empty intake is preplanned as active and continued until the next cover sheet able to be called up is consistent with the next book block to be fed; in this way, no empty cycles are required intermediately.

All of the barcode scanner systems of the overall facility are operatively connected to a superordinate facility control unit which in terms of control technology detects on the one hand the facility for operating 2, 3 and 4-gang runs for producing signatures and signature packs, and on the other hand the downstream print further processing machines with the associated handling stations. This superordinate facility control unit also initiates the retooling of the involved handling stations as soon as the dimensions, such as thickness and/or format of the book blocks, have comparatively large deviations in comparison to the dimensions of the fundamental adjustment. In principle, this superordinate control facility operates comprehensively, using stored control profiles, or using production-dependent feedback-control interventions, or using predictive control systems, wherein it is ensured by redundant safeguards that the operation of the overall facility has high stability.

If the print further processing machine already mentioned several times above is formed by an adhesive binder of the newer generation (cf. EP3406456 B1, in which case this publication of the applicant forms an integral part of the present application, wherein other adhesive binder embodiments can also be used). This particularly focused, super-compact adhesive binder machine (EP3406456 B1) has the advantage that it has a book block transport system with a closed guide track on which three superordinate transport clamps operate, which are in each case fastened to the machine frame of this adhesive binder by means of a guide assembly, and the book blocks are transported along the handling stations associated with the guide track, said handling stations consisting substantially of a block introduction station, a spine handling station of a glue application station, a glue application verification, a drying station, at least one lining station and lining pressing station, at least one cover sheet station.

This adhesive binder is furthermore equipped with a clamping opening system which is composed of at least one clamp-internal and of at least one clamp-external element, wherein both elements are operatively connected to one another by way of which an opening of the clamp jaws associated with the binding clamp is able to be established, wherein the clamp-external element at a loading location of the book block by a barcode scanner command is able to be actuated by a motorized pressing operation toward the movable clamp-internal element in such a manner that the latter initiates targeted opening of the clamp jaws associated with the binder clamp as a function of the thickness of the book block to be received, wherein this pressing operation at the same time builds up a preferably spring-force-related reaction force which is then available as a contact pressure force acting on the book block received.

The disclosure will be explained hereunder with reference to the figures as the scope of the drawing to which explicit reference is made in terms of all details which are essential to the disclosure and not highlighted in more detail in the description. All elements which are not essential in terms of the direct understanding of the disclosure have been omitted. The same element are provided in the various figures with reference signs relating to the specific figure or to multiple figures. Explanations of abbreviations or technical terms are to be found above.

To be seen in FIG. 1 is a typical bandwidth of an infed paper web of 22.5" (approx. 572 mm), which is used as the basis for preparing differently designed gang runs, whereby it remains not precluded that the preparation of gang runs equipped to a further extent is operated using wider paper webs. In the process according to FIG. 1 the arrangement is essential that the paper web 110 maintains the specified running pattern. Proceeding from a paper web width 110 of 22.5", a symmetrical web width 110*a* in the context of a 2-gang run 150 can be achieved additionally by a folding operation which by way of a folding device 100 is carried out centrically.

It is furthermore possible for the original paper web width 110 to be converted to a 3-gang run, wherein the physical design embodiment achieved therewith is configured as a Z-fold 160. For this purpose, the folding device 110, which was originally positioned in the center, is moved by a distance s (Pos. 120*a*) of 95 mm from the center towards the right to a new position 110*a*, whereby s corresponds to the adjustment path of the folding device. As a result of this adjustment, a portion with a length of 381 mm is created on the left side (Pos. 120). For further explanations relating to the Z-fold, reference is made to the illustration in FIG. 2 for the avoidance of unnecessary repetitions.

Furthermore, it is also possible for a 3-gang run to be configured as a W-fold 170 in which the original folding device 110 is moved to a new position 110*b*, which is displaced by the distance s (Pos. 130*a*)=95 mm from the center towards the left, wherein a portion with a length of 381 mm (Pos. 130) is created on the right side as a result of this adjustment. For further explanations relating to the W-fold, reference is made to the illustration in FIG. 3 for the avoidance of unnecessary repetitions.

Finally, Pos. 140 shows how the locations Z-fold 100*a* and W-fold 110*b* relate to the paper web width 110 to the extent that the latter is in each case divided into ⅓, the respective folding process in this way taking place at an equal spacing from the periphery.

Moreover, the following aspects are pointed out:

a) In conventional systems, the paper web widths in the corresponding number are converted to longitudinally folded configurations. The number of book pages with printed number of gang runs specified by the print copy results in the number of empty pages. The latter have already been reduced per se by omitting a transverse fold, but said empty pages still remain in the completed book block.

b) In the case of an underlying combination according to the disclosure of transversely folded sheets followed by individual sheets, the empty pages can likewise be reduced to a number of empty pages specified by the number of gang runs. However, the empty pages cannot be completely avoided even when deflecting and ejecting are combined, but said empty pages can be ejected automatically and without limiting the production output as well as without the complexity of ejection turnouts, as a result of which the number of empty pages can be reduced to a maximum of 1 based on a targeted number of gang runs. In terms of the expiry of a sequence, the following considerations apply:

c) In addition to the variability of transversely folded sheets, which are present as a result of deflected individual sheets, individual sheet halves which contain only white paper can be ejected. Provided to this end is a dynamic longitudinal cutting unit ahead of and behind cross cutting, which dynamic longitudinal cutting unit separates the sheet part in the center, preferably by way of the longitudinal perforation. The sheet, which is now in two parts, is conveyed in the direction of the transverse fold (transverse air fold). The corresponding air pulse at the air folding unit is implemented only where the sheet part has a print layout, whereupon said sheet part is deflected and in most instances conveyed to the subsequent station by a longitudinal folding unit. In contrast, the unprinted sheet parts are not impinged by air pulses, as a result of which said unprinted sheet parts are then directly conveyed to waste collection.

d) The information pertaining to which sheet part the selective separating station is to be first activated and the corresponding air pulse has subsequently to be suppressed for the purpose of ejection, or conversely which sheet part is to be conveyed onward, is in one case assigned to the main control unit or sub-control unit by way of management systems or by way of a batch table; in another case, the scanning of significant items of information can be implemented by barcodes which are imprinted on the signatures or sheet parts. As a result, the number of empty pages in a book block can be reduced to one.

Figure 2:
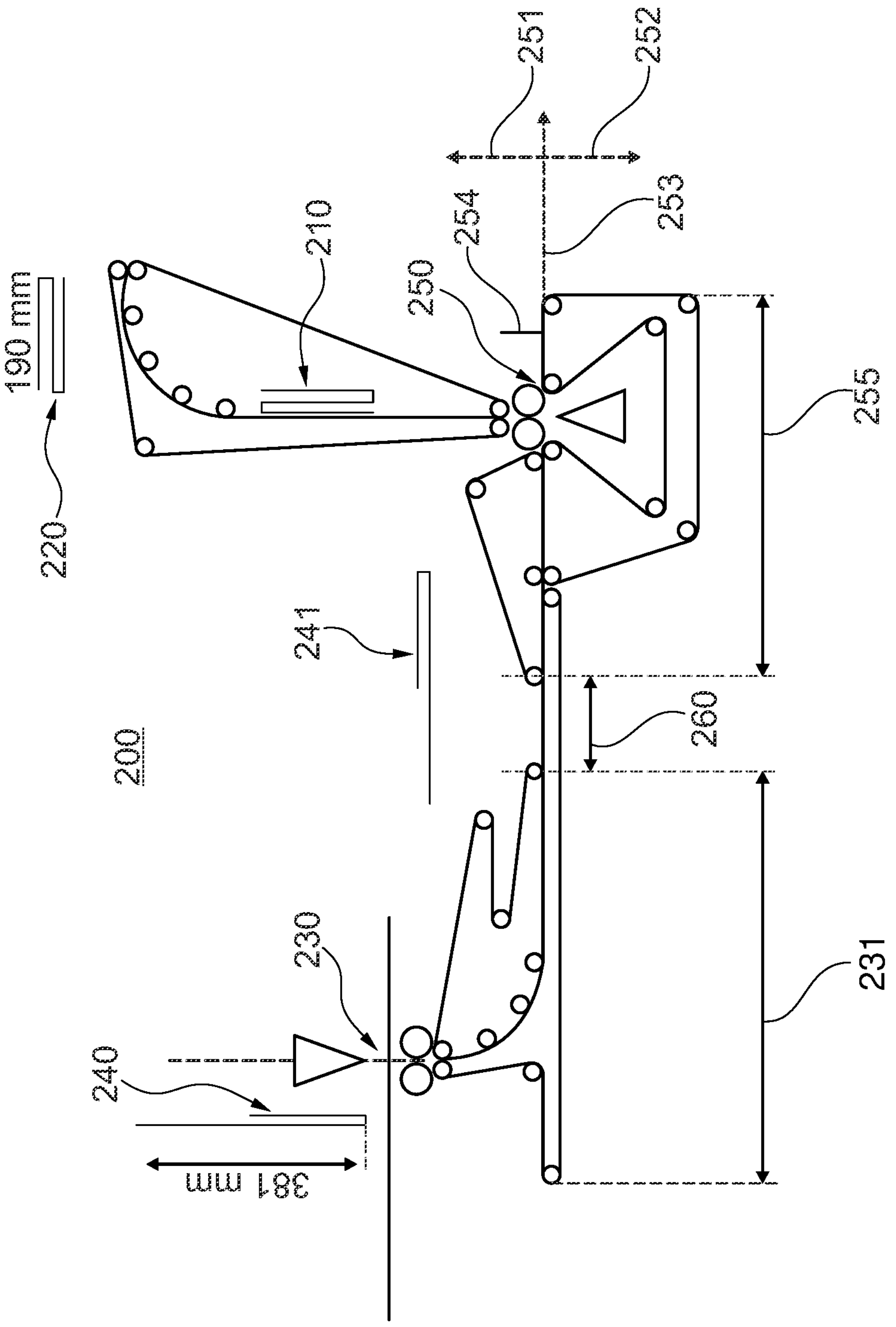
FIG. 2 shows a pass for forming a Z-fold.

FIG. 2 shows the schematic run 200 in the production of a Z-fold 210, the fold width thereof finally being 190 mm (cf. Pos. 220). Reference is made to FIG. 1 for better understanding how the fold widths are established. In principle, the run corresponds to the sequences according to FIG. 8, i.e. a first folding operation takes place in a first folding device 230 (here acting perpendicularly from above), in which an initially generated folding geometry 240 is provided with portions of initially different lengths, said folding geometry 240 then having the preconditions for the later formation of a Z-fold, wherein the position of this initially generated fold geometry 240 during transport is derived from Pos. 241 in FIG. 2. This initially generated folding geometry is subsequently transferred to a downstream folding device 250 (here acting perpendicularly from below), in which the final folding so as to form a geometrically so-called Z-fold 210 takes place. The onward conveyance of the Z-fold 210 after the folding procedure can take place towards the top 251 or towards the bottom 252. It is also possible to provide horizontal continual onward transport 253 after the folding device 250. In such a case, the detent 254 (cf. FIG. 8, Pos. 841) should be designed without obstacles in the transport direction. If the transport sections for the first folding device 230 (run 231) and for the second folding device 250 (run 255) are in each case operated independently, the cycle conformity thereof during transport of the folding geometry is ensured by a compensator 260.

Figure 3:
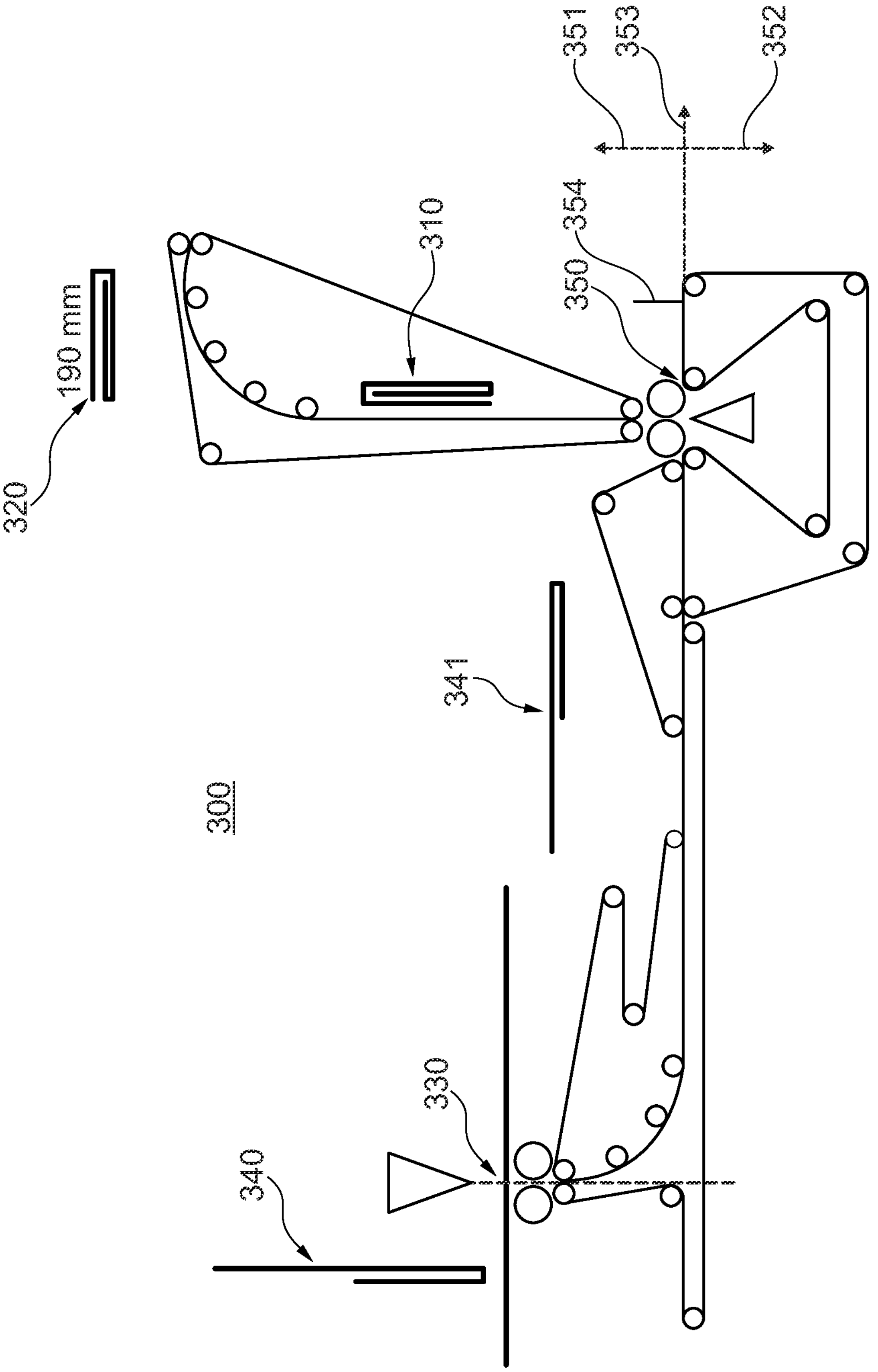
FIG. 3 shows a pass for forming a W-fold.

FIG. 3 shows a further schematic run 300 in the production of a W-fold 310 as a 3-gang run, the final fold width thereof being 190 mm (cf. Pos. 320). Reference is made to FIG. 1 for better understanding how the fold widths are established. In principle, the run corresponds to the sequences according to FIG. 8, i.e. a first folding operation takes place in a first folding device 330 (here acting perpendicularly from above), in which an initially generated folding geometry 340 with portions of initially different lengths is established, said folding geometry 340 having the precondition for the later formation of a geometrically so-called W-fold, wherein the position of this initially generated folding geometry 340 during transport is derived from Pos. 341 of FIG. 3. Subsequently, this initially generated folding geometry is transferred into a downstream folding device 350 (here acting perpendicularly from below), in which the final folding so as to form a W-fold 310 is performed. The onward conveyance of the W-fold 310 after the folding procedure can take place towards the top 351 or towards the bottom 352. It is also possible to provide horizontal continual onward transport 353 after the folding device 350. In such a case, the detent 354 (cf. FIG. 8, Pos. 841) should be designed without obstacles.

Figure 4:
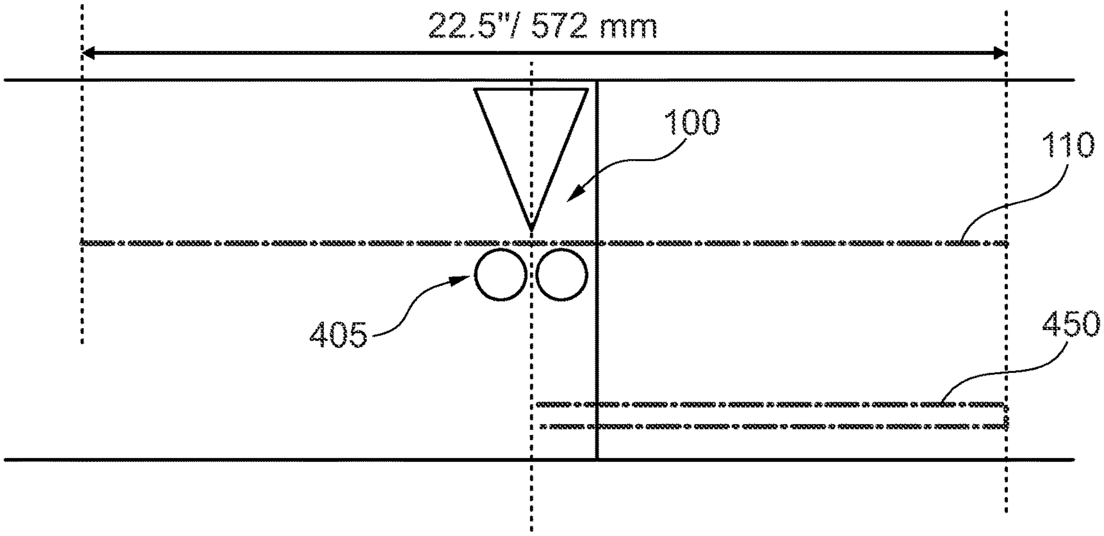
FIG. 4 shows a folding procedure in a 2-gang run.

FIG. 4 shows the folding procedure in a 2-gang run, whereby the folding device 100 corresponds substantially to the embodiment according to FIG. 1. For improved understanding, the folding resulting from this procedure is derived from Pos. 450 in the drawing. For the avoidance of unnecessary repetitions, reference pertaining to the folding procedure is made to FIG. 4*a* and to the explanations in EP 3 597 430 A1, in which FIG. 1 shows and describes the incorporation of the folding procedure in the context of selective transverse folding of printed printing sheets in more detail.

The transverse folding as part of the method can be implemented as an alternative to the longitudinal folding, whereby both types can readily be used not only alternatively but also in combination with one another, depending on the configuration and the constellation of the gang runs and procedures, which in terms of significance to the disclosure is also to be understood in this sense.

Figure 4A:
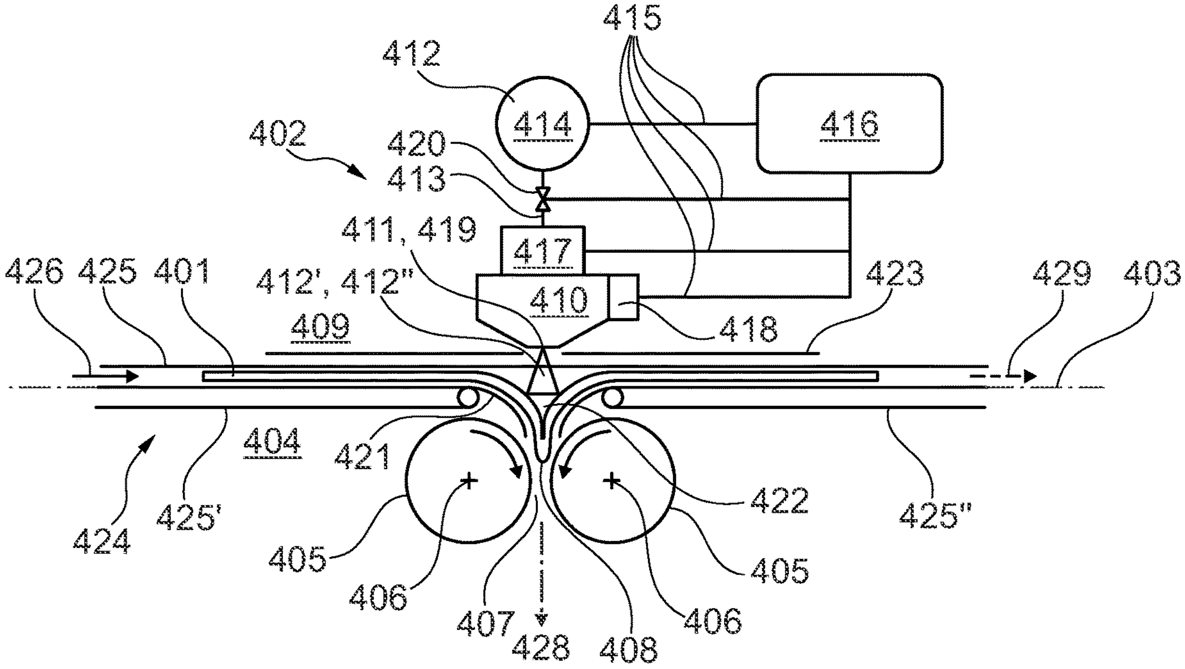
FIG. 4*a* shows a device for folding print products.

FIG. 4*a* shows an exemplary embodiment of a device 402 for the transverse folding of print products, in which it consists of printing sheets 401 in each case comprising at least two printed pages. This FIG. 4*a* is of a qualitative nature so as to meet the requirements of the disclosure. The folding device 402 has a guide plane 403 in which the printing sheet 401 is in each case fed and from which the printing sheet 401 is directed onwards for folding. The guide plane 403, which here is illustrated as running horizontally, can of course also be disposed vertically or at any arbitrary angle in space, which enables a multiplicity of options in terms of construction depending on the specific applications. Although only a single printing sheet 401 is described and also only one single printing sheet 401 is in each case shown in the figure here and also hereunder for reasons of simplicity, there is actually either a single printing sheet 401 or a plurality of printing sheets 401 lying on top of one another during operation.

Two folding rollers 405 are disposed on a first side 404 of the guide plane 403 which in the first exemplary embodiment for illustrative reasons is illustrated below the guide plane 403. Said folding rollers 405 have in each case a rotation axis 406, and conjointly form a folding gap 407 in which the folding operation of the printing sheet 401 to be folded takes place at a fold line 408 which is prepared or else at a fold line 408 which is not prepared. The rotation axes 406 of the folding rollers 405 are aligned so as to be mutually parallel as well as parallel to the guide plane 403. On a second side 409 of the guide plane 403, which lies opposite the first side 404 of the guide plane 403 and in the first exemplary embodiment shown in FIG. 4*a* is shown above the guide plane 3, there is a compressed air installation 410 in the region of the folding gap 407. The compressed air installation 410 has at least one exit opening 411, but preferably a plurality of exit openings 411, for compressed air 412, said exit openings 411 being directed onto the folding gap 407, wherein this compressed air installation 410 by way of a compressed air line 413 is connected to a compressed air source 414 and the latter in turn is operatively connected by way of a control line 415 to a control unit 416 of the device 402. Moreover, the compressed air installation 410 comprises a first control element 417 which is configured as a magnetic valve, for example, and serves for varying the duration of impingement and is provided with at least one exit opening 411 for compressed air 412, wherein a second control element 418, here configured as a slide, for example, serves for varying a cross-sectional area 419 of this exit opening 411 and may at the same time also be configured as a pressure reduction valve, for example. A third control element 420 which serves for varying a pressure of the compressed air 412 that is able to be fed to this exit opening 411 is disposed in the compressed air line 413. The control elements 417, 418, 420 are connected to the control unit 416 by way of in each case a control line 415.

A first guide element 421 for the printing sheet 401 which while being provided bears on the latter is disposed substantially in the guide plane 403 of the device 402, and is provided with a recess 422 for the printing sheet 401, configured in the region of the folding gap 407, and for the compressed air 412 which is in each case emitted in the form of a compressed air pulse 412' (412") from the exit openings 411. Provided in addition to the first guide element 421 is a second guide element 423 for the printing sheet 401, which is disposed between the first guide element 421 and the compressed air installation 410 and optionally interacts with the first guide element 421.

For example, a guide table can be used as the first guide element 421. Of course, a plurality of narrow guide elements which are mutually spaced apart, i.e. may be disposed next to one another and/or behind one another, can also be provided instead of a single guide table. As is illustrated in FIG. 4*a*, the first guide element 421 in the region of its recess 422 can be extended in length out of the guide plane 403 up to close to the region of the folding rollers 405 so as to guarantee better guiding of the printing sheet 401 to the folding rollers 405. A stationary element such as, for example, a guide plate, can likewise be used as the second guide element 423. The second guide element 423 reaches directly into the region of the exit openings 411 of the compressed air installation 410, so that it is also advantageous that the two trailing ends of the printing sheet 401, which is conveyed into the folding gap 407 between the folding rollers 405, are also able to be guided in a defined manner by the second guide element 423. Of course, the second guide element 423 can also have a plurality of narrow individual elements which are disposed so as to be mutually spaced apart, next to one another and/or behind one another Like the guide plane 403 of the folding device 402, the first and the second guide element 421, 423 can also be disposed horizontally, vertically or at an arbitrary angle in space, depending on the specific applications. Finally, the folding device 402 has a transport unit 424 which is composed of an upper transport belt 25 and two revolving lower transport belts 425', 425", by way of which the printing sheets 401 can be provided in a first infeed direction 426 which runs substantially orthogonally to the rotation axes 406 of the folding rollers 405. In FIG. 4*a*, this infeed direction 426 of the printing sheet 401 is horizontal or quasi-horizontal in relation to the effective plane of the folding rollers 405, whereby this infeed direction of the printing sheet may also be perpendicular or quasi-perpendicular, or by way of another plane in space in relation to the effective plane of the folding rollers 405. In this way, the underlying folding device 402 for the transverse folding of printing sheets 401 can be used in an arbitrary manner, independently of the type and the infeed plane of the printing sheet 401.

Figure 5:
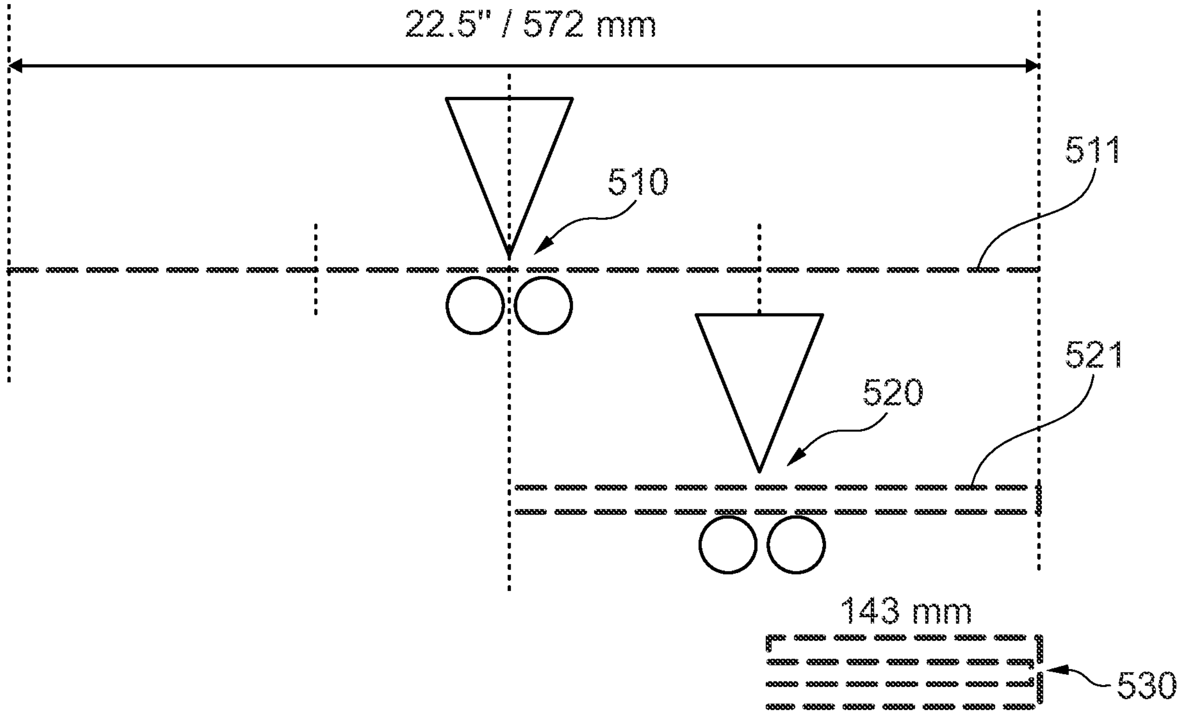
FIG. 5 shows a sequential folding procedure in a 4-gang run.

FIG. 5 shows a sequential folding procedure in a 4-gang run, consisting of a first folding procedure 510 and a second folding procedure 520, which according to FIG. 5 fold the first sheet part 511 and the second sheet part 521 symmetrically along the width subsequently or sequentially, respectively. The result of this sequential folding procedure is a product 530 which has been folded multiple times and is a quarter of the original width 511, wherein the quarter may also correspondingly vary in terms of the sheet length, when there is the task to generate a leading fold or a trailing fold, as is typically required for SH or FH in the corresponding further processing machines, specifically for the opening process of the signatures. In the case of such folding in combination with a first and a second longitudinal perforation, which is not drawn in more detail, in the region of the first and the second folding planes 510, 520 (which in the case of corresponding arrangements does not preclude a transverse perforation), further aspects according to the disclosure can be incorporated, in which it is unimportant whether the sheets 510 and/or 520 are provided only with a longitudinal perforation at the first pair of folding rollers of the corresponding first folding procedure 510, the corresponding sheet then only is deflected and folded only at the second folding procedure 520, or in the reverse order is first folded and then deflected. These sequences or the interactions between a folding procedure and simple deflection are derived from FIGS. 7 and 8. Furthermore, it is also possible to carry out the deflection as well as the folding with W-folds or Z-folds. The position and arrangement of the pairs of folding rollers in the figure are only schematically illustrated in the case of the first folding procedure 510 as well as the second folding procedure 520. Position, angle and size of the pairs of folding rollers can be adapted such that the sheet parts are fed to the folding device such that different folding patterns occur at any time, so for example as a zigzag fold, a spiral fold, a double parallel fold.

The process steps described individually here can accordingly be performed in an arbitrary sequence as has already been explained above, on the one hand, and on the other hand said process steps can be carried out without any additional gaps prior to the folding, deflecting, or ejecting process. Since an air pulse in the range of <40 ms, preferably <10 ms, is used for operating the temporal intervals required for the individual functions, there are in this regard no dependencies in terms of speeds and cycle rate in comparison to a changeover relating to the individual functions. The same considerations also apply when the folding processes are performed by mechanically controlled means.

Figure 6:
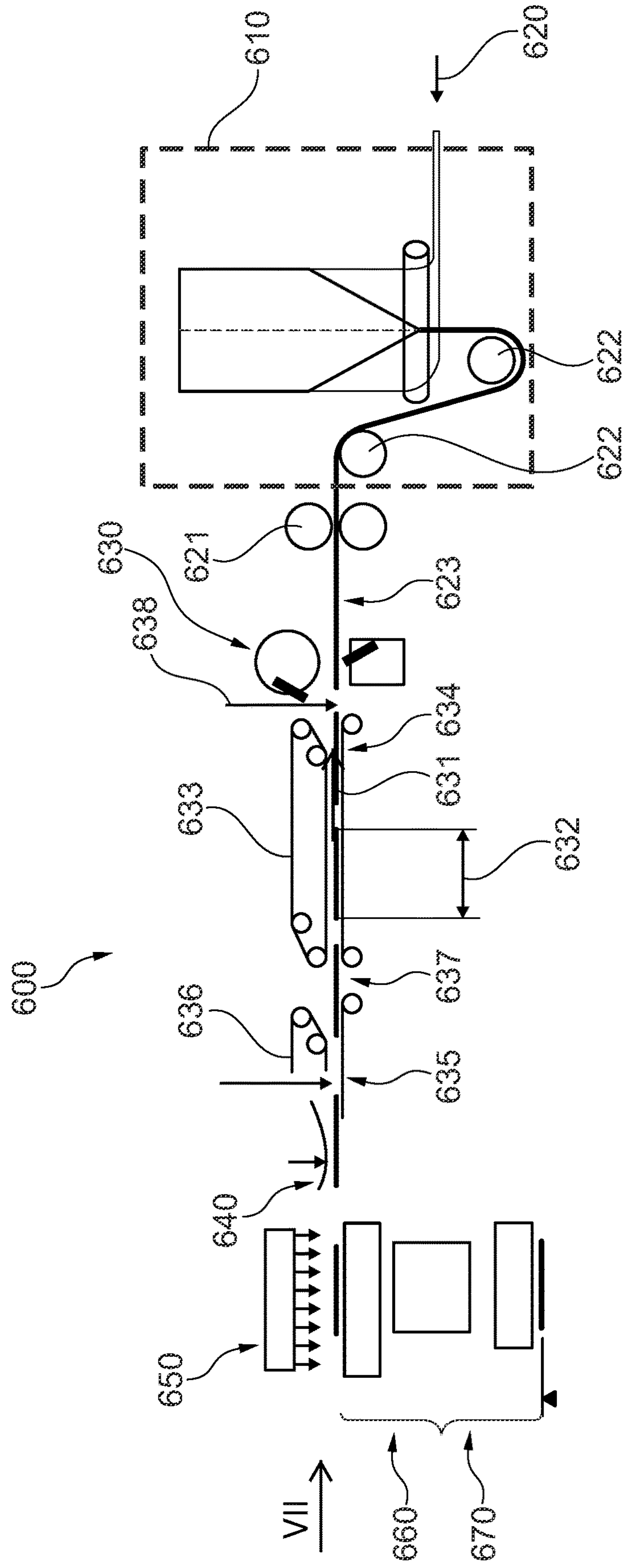
FIG. 6 shows a process chain when providing signatures.

FIG. 6 visualizes the process chain 600 when providing signatures, proceeding from a funnel 610 up to and including a longitudinal fold 1, thus LAF1 650. The funnel 610 indicated here is to be understood only to be an option, in particular when the paper web widths are to be >22.5". The optional infeed of the paper web widths from the funnel 610, as well as the usual infeed by way of the endless web 620, by way of conveyor rollers 621 and deflection rollers 622 are transferred to a new operating level 623 which in essence forms the processing plane. The conveyor rollers 621 act as tension rollers by way of which a tensioning force is exerted on the paper web width in such a manner that the downstream cross cutter 630 operates with a gap 638 of approx. 0.5-4%; this requires that said cross cutter 630 is supplied with a tautly guided paper web, the cutting quality always being guaranteed in this way, i.e. the paper web can be cut transversely to the running direction at a predefined cutting length 632 in a precise, reliable and loss-free manner. The sheet parts 631 formed in this way are initially acquired by a first sheet transport device 633 and conveyed onward along a first transport section 634, said sheet parts subsequently being transferred into a second transport section on the same plane, in which a second sheet transport device 636 assumes the onward transport of the sheet parts 631. The reliable transfer, even of variable-format sheet parts, takes place between the transport sections 634 and 635. An ejection opening 637 which ensures the sustainable quality assurance of the sheet parts 631 directed onward is disposed between the first 633 and the second sheet transport device 636. The size of this ejection opening 637 corresponds to a transport time constant of approx. 20 ms, whereupon the intact sheet parts can be transferred to the following transport section 635, which intact sheet parts are conveyed onward by the second sheet transport device 636 and subsequently directed to a downstream sheet braking device 640.

The transport time constant depends on the functioning of the sheet braking device 640 in the LAF1 650, whereby the ejection opening 637 by way of the transport time constant which in terms of quantity is established to be approx. 20 ms meets two requirements:

a) on the one hand, it is an objective to ensure that the sheet parts 631 are reliably ejected at the turnout;
b) on the other hand, high cycle rates (>40,000 c/h) are to be guaranteed, and these are to be performed by way of an operative connection to the operation of the sheet braking device 640.

The sheet part 631 is subsequently guided further in the direction of the LAF1 650 and at the latter is either individually folded 660, or alternatively the pre-collected and folded signature packs are guided in the direction of an alignment section 620. This alignment section 620 here fulfills the following functions:

1. An alignment of the folded individual signature or folded signature packs in the 2-gang run (cf. FIG. 4, for example) for the purpose of precise auxiliary gluing of the printed products in the downstream collation process.
2. An alignment of the folded individual signature or of the folded signature packs in the 3 and 4-gang run (cf. FIG. 8, for example) for the precise folding in the second longitudinal fold LAF 2 840, and precise auxiliary gluing in the downstream collation process, whereby the auxiliary gluing must be at the suitable location of the finished book. The auxiliary gluing can lie selectively, as an example, in the footer or header, or footer and header region, of the signature or signature packs, respectively.

The operation of the sheet braking device 640 for decelerating and positioning the provided sheet part 631 takes place, for example, by way of a braking force which is exerted by a means and which generally establishes the positioning of this sheet part 631. The refinement of this sheet braking device 640 lies in that a first means is operated such that the latter exerts a pneumatic force on the sheet part 631, which pneumatic force is controlled by pulses of various intensity and intervals that trigger the braking force. Furthermore, a second means, which establishes at least one frictional force which generates a braking force and acts on the sheet part 631, intervenes, wherein intermittent, uniform or oscillating braking forces on the sheet part 631 are generated by the first and/or the second means in such a manner that the resultant braking forces are managed by a control unit which is operated by variable control profiles, either stored or intervening, that are able to be activated based on the retrieved operating parameters. The advantages of this sheet braking device 640 can be gathered in summary as follows: In comparison to conventional solutions, there are no longer any prominent, kinematically guided complex mechanisms at the forefront, as a result of which deficits are no longer to be anticipated even at high cycle rates on account of transmitting power and instances of wear and tear. Proven elements, the operation of which relies specifically on air pulses can be used, as a result of which special adjustments relating to the paper thicknesses are no longer necessary so that correspondingly operative stability can be achieved. The deceleration to an exact position can be in particular implemented always to a precise point using the two means described. The operative significance of the underlying sheet brake device 640 lies in that the latter can be implemented as a complementary measure multiple times into systems irrespective of with which method the multiple changes of the type of production is carried out.

Figure 7:
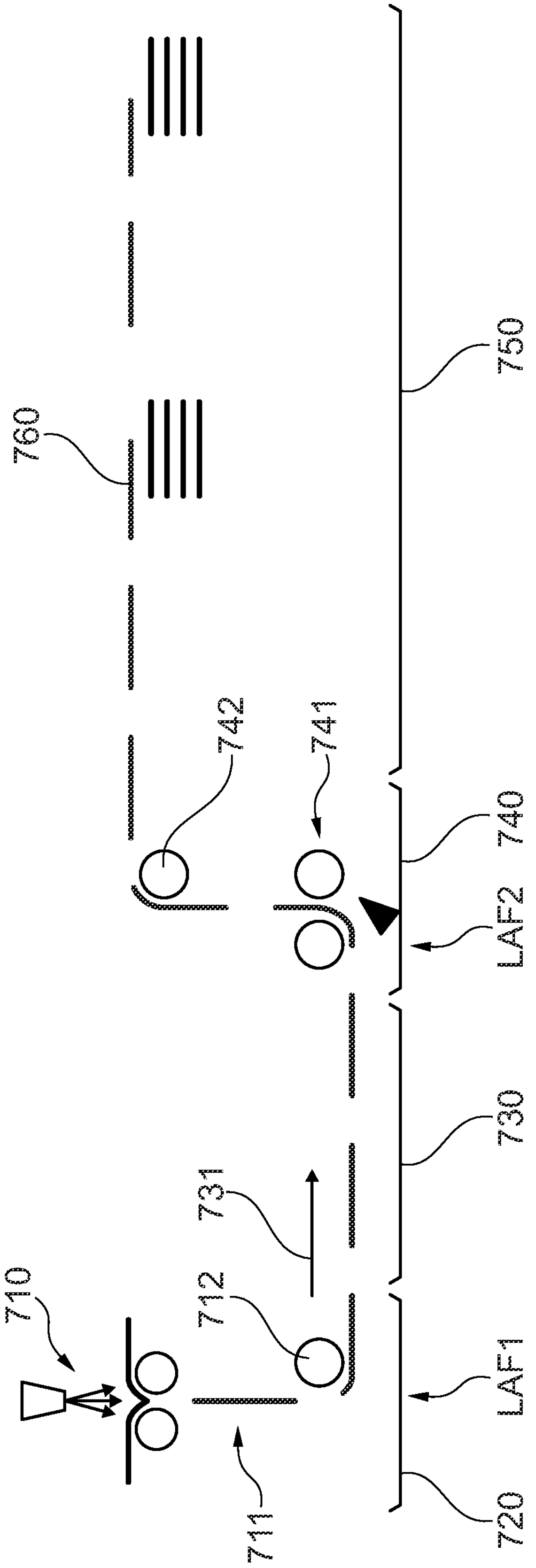
FIG. 7 shows a process in the 2-gang run operation.

FIG. 7 as a frontal view of FIG. 6 (cf. arrow VII in FIG. 6) shows a process in the 2-gang run operation in which the signature or signature packs are folded in the folding device 710 in the LAF1 region 720 and transported onward 711. A conveying section 730 in which the folded material is aligned so as to conform to processing extends downstream of the last deflection roller 712, before said folded material is subjected to a simple deflection 741 along the following section 740, LAF2 region, no further folding thus taking place. The collation section 750 in which the sheet parts 760 are prepared and correspondingly stacked for further processing extends downstream of a further deflection roller 742 (cf. also FIG. 6 to this end).

Figure 8:
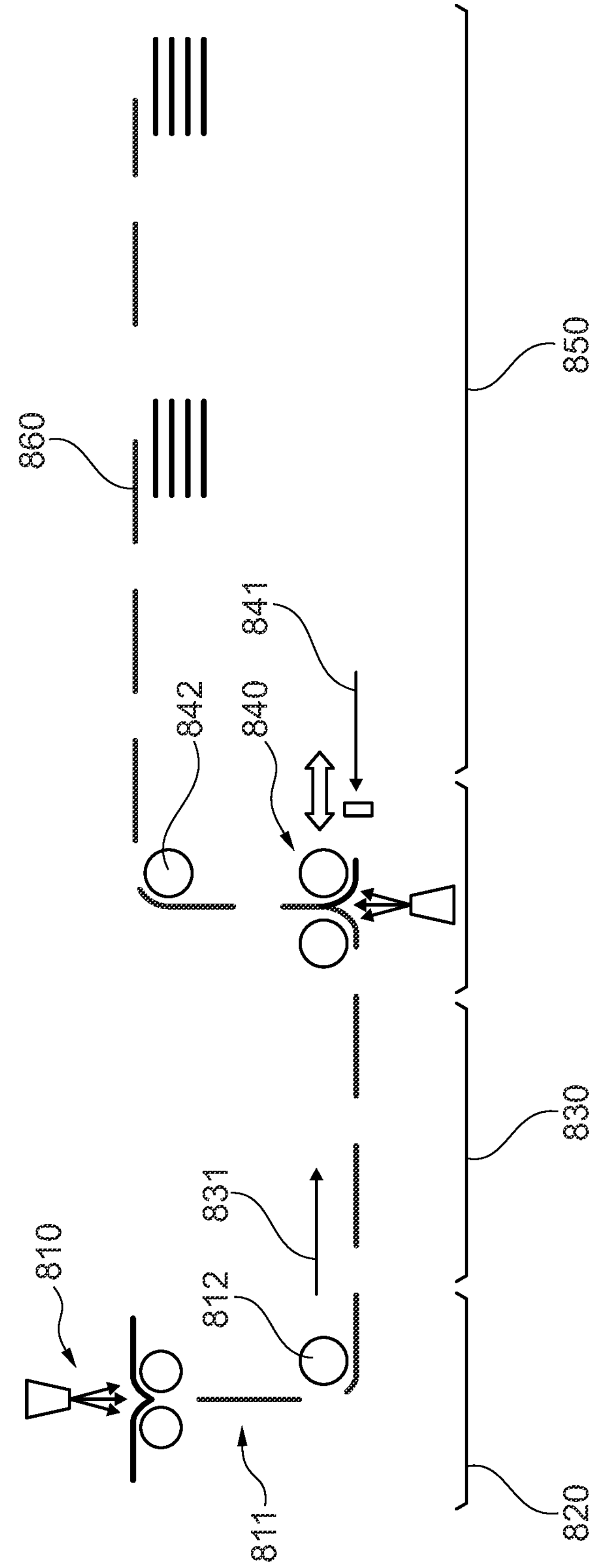
FIG. 8 shows an extended process in the 3 or 4-gang run operation.

FIG. 8 as a further frontal view of FIG. 6 (cf. arrow VII in FIG. 6) shows an upgraded process in the 3 or 4-gang run operation, in which the signature or signature packs are folded by an additional folding device 840 in the LAF2. First, the signature or signature packs are processed by a first folding device 810 in the LAF1 region, and subsequently transported onward 811. A conveying section 830 in which the folded material is aligned so as to conform to processing extends downstream of the last deflection roller 812, before the folding device 840 which is next in line in the LAF2 is used. This folding device is provided with a detent 841 which acts as a transport stop for the signatures but also ensures that the folding taking place here is performed according to symmetrical principles. The so-called collation section 850 in which the sheet parts 860 are prepared and correspondingly stacked for the further processing extends downstream of a further deflection roller 842 (cf. also FIG. 6 to this end).

It applies to the operation of FIGS. 6, 7, 8 that the number of longitudinal folds is fundamentally not restricted to two but may be increased at any time. However, it is to be emphasized in this context that the focus mentioned at the outset here is directed towards paper webs with a maximum width of 22.5" (cf. FIG. 1), from which an advantageous number of two longitudinal folds can be implemented at a maximum width of the signature blocks of 143 mm in the 4-gang run (22.5"/4).

Figure 9:
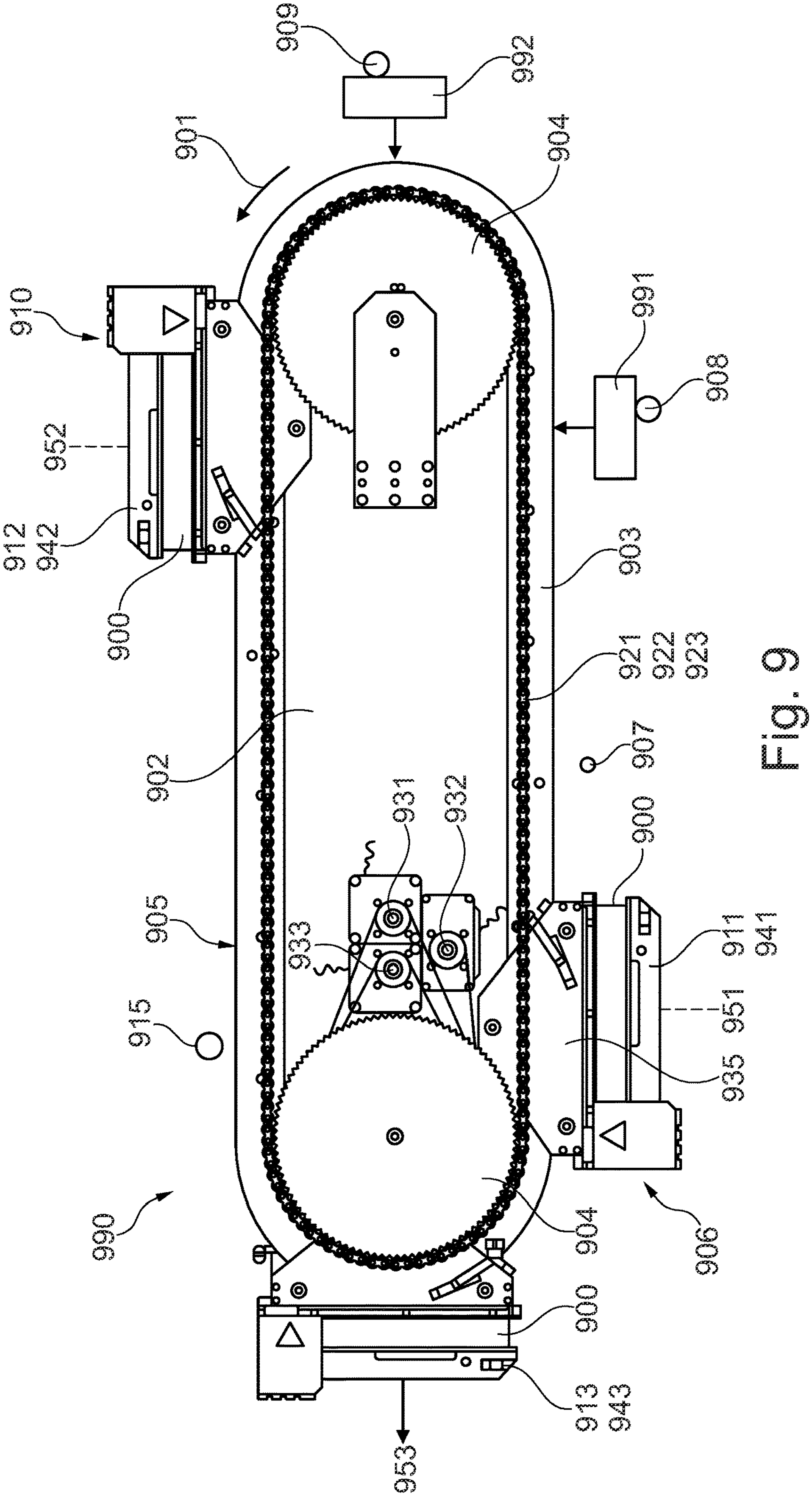
FIG. 9 shows an adhesive binder.

Illustrated in FIG. 9 is an adhesive binder 990 of the later generation, which in principle and initially has been conceived for the intended use for producing softcover and hardcover books. According to the disclosure, modified embodiments of these two fundamental books can also be produced, as will yet be discussed in detail further below. Print products in a raw form from a thread-binding machine can also be introduced into such an adhesive binder 990 and finished according to various final criteria. In such thread-bound print products, it is merely to be ensured in terms of control technology that such print products can be transported neutrally across the spine router 906. The continuous or alternating processing of embodiments of different types, down to a single book block, can be sustainably maintained in that the adhesive binder 990 is equipped with a barcode scanning system at suitable locations, and the book blocks, depending on the variant of embodiment, are provided with corresponding individual barcodes. The items of information detected therefrom are processed in a central control unit, for operation of the adhesive binder which is direct, product-related and continuous.

An adhesive binder 990 is shown in a view from above in FIG. 9, wherein print products from a thread-binding machine can also be introduced into this adhesive binder. This adhesive binder 990 possesses a book block transport system 902 having a closed guide track 903 on which three transport clamps are disposed below one another, which transport clamps by means of a guide assembly are in each case generally moved through handling stations which are fastened to a machine frame of the adhesive binder 990 and are disposed along the guide track 903. By way of example for such handling stations in general, a block introduction station 905, a spine handling station (spine router) 906, a glue application station and a glue application verification 907, a lining station 991 with lining strips 908 consisting of an envelope and/or lining pressing station, a cover sheet feeder 992 with cover sheets 909, a layout station 910, and a drying station 915, are to be mentioned here.

Moreover, this adhesive binder 990 has three drives 941, 942, 943, wherein a first drive 941 is assigned to a first transport clamp 911, a second drive 942 is assigned to a second transport clamp 912, and a third drive 943 is assigned to a third transport clamp 913. The drives 941, 942, 943 possess in each case a drive chain 921, 922, 923 which are likewise disposed below one another and to which the assigned transport clamp 911, 912, 913 is fastened, and which by way of in each case one sprocket 904 is driven by a drive motor 931, 932, 933 in the running direction 901. The drive motors 931, 932, 933 here are actuated by a machine controller of the adhesive binder 990. Speed profiles of different designs are stored in the machine controller so that the transport clamps 911, 912, 913 can in each case be moved by a dedicated speed profile along the guide track 903. Consequently, a book block transport system 902 which is equipped merely with two or more than three transport clamps 911, 912, 913 and with a corresponding number of drive installations may also be used.

This adhesive binder 990 possesses a number of stopping positions 951, 952, 953 at which a transport clamp 911, 912, 913 can be brought to a standstill in each case by the drive 941, 942, 943 assigned thereto. Illustrated are, for example, a first stopping position 951 for the introduction of loose book blocks or books or print products, a second stopping position 952 for pressing a cover sheet onto a book block 900, and a third stopping position 953 for rejecting bound book blocks 900. If a handing station 908 configured as a lining station 991 for applying a lining strip is present, a further stopping position is provided in the region of the latter. Stoppage times of different lengths can be stored in the machine controller for the stopping positions 951, 952, 953 and further stopping positions if required. The adhesive binder 990 can moreover be upgraded with an installation, which serves for varying the extension of the book blocks 900 and thus to the variation of the spacing of the latter relative to the stationary handling stations 905 in general.

Accordingly, at least downstream of the formation of 2, 3 and 4-gang run signatures or signature packs as described above, and of the subsequent dynamic cutting for the formation of individual sheets, the downstream adhesive binder 990 which in general may also be composed of another adhesive binder machine, consists at least of a device composed of an adhesive binder, in which an endsheet feeder is integrated and used, whereby it is also possible that such an endsheet feeder is disposed autonomously outside the adhesive binder and from that location operates so as to be operatively connected to the adhesive binder. Besides the adhesive binder in the form of a machine, the further processing of the introduced book blocks is controlled or feedback-controlled by at least one barcode scanning system. If the endsheet feeder is incorporated in the adhesive binder, said endsheet feeder is in such a case preferably disposed at the head of the adhesive binder so that said endsheet feeder is immediately available for the production of all type-specific print products. The production of the individual type-specific print products is carried out according to the following criteria, whereby the production set forth here does not form any numerus clausus, i.e. even other modified embodiments can be produced mutatis mutandum:

1) In the production of a first type-specific print product in the form of a hardcover (HC), the specific handling in the adhesive binder lies in that the infed book block, for enabling a higher cycle rate, is already supplied with an endsheet; this book block then runs through the orderly handling stations in the adhesive binder until the next type-specific handling takes place in a lining station disposed downstream.

2) In the production of a second type-specific print product in the form of a modified hardcover (HC), the specific handling in the adhesive binder lies in that the book block already supplied with an endsheet runs through the orderly handling stations in the adhesive binder until the type-specific handling takes place in the lining station disposed downstream. The print product thus produced can subsequently be upgraded in that the latter in a cover sheet feeder disposed downstream to the lining station is optionally supplemented with a cover sheet, which leads to a further variant of embodiment.

3) In the production of a third type-specific print product in the form of a modified hardcover (HC), the specific handling in the adhesive binder lies in that the infed book block is supplied without a cover sheet; this book block then runs through the orderly handling stations in the adhesive binder until the next type-specific handling takes place in a lining station disposed downstream. The print product thus produced can subsequently be upgraded in that the latter in a cover sheet feeder disposed downstream to the lining station is optionally supplemented with a cover sheet, this leading to a further variant of embodiment.

4) In the production of a fourth type-specific print product in the form of a softcover (SC), the specific handling in the adhesive binder lies in that the book block is supplied or equipped without an endsheet; this book block runs through the orderly handling stations in the adhesive binder while bypassing handling in the lining station. The book block downstream of this lining station is equipped with a cover sheet in a cover sheet feeder. Optionally, handling in the lining station can be included, this leading to a further variant of embodiment.

5) In the production of a fifth type-specific print product in the form of a modified softcover (SC), the specific handling in the adhesive binder lies in that the book block is supplied with an endsheet; this book block runs through the orderly handling stations in the adhesive binder while bypassing handling in the lining station. The book block downstream of this lining station is equipped with a cover sheet in a cover sheet feeder. Handling in the lining station can optionally be included, this leading to a further variant of embodiment.

6) In the production of a sixth type-specific print product with associated variants of embodiment, this is a thread-bound book (FH) which emanates from a (separate) thread-binding machine and which is then for final handling transferred into the adhesive binder or generally into a print further processing facility and therein is identified by at least one barcode scanner and correspondingly transported onward, whereby a first report pertaining to the established type-relevance of this book is sent to the router station of the adhesive binder; as a result of a command input, no handling of the spine of such a book block is performed there, this handing station thus being skipped in terms of control technology. Prior thereto, the thread-bound book is optionally equipped, thus with or without an endsheet, in a facility-internal or autonomously operable endsheet feeder. The thread-bound book, after having been introduced into the adhesive binder, runs through the router station without handling, as has already been mentioned, and thereafter is optionally processed in a lining station and/or in a cover sheet feeder. It is also possible for such books to be produced on a hardcover machine with available hardcovers, for these books to be then glued and to be equipped with a spine/insert band, if required.

In summarizing these types of embodiment it can therefore be established that a large number of variants of embodiment of type-specific print products are able to be produced by including the underlying adhesive binder or another adhesive binding machine and/or a production-dependent thread-binding machine and/or a hardcover machine and/or a binding machine, whereby the number of variants of embodiment in focus here is not to be considered exhaustive.

7. In the production of a further type-specific print product, the latter is from a saddle stitcher which has print product-related processing stations and at least one barcode scanner system which is capable of detecting the individual print product-related signatures provided with barcode, of individually designing the processing of said signatures in the saddle stitcher, and of carrying out the final finishing in terms of the cover sheet to be attached.

The attachment of the endsheet, the lining strip, the cover sheet, at least in the case of the type-specific print products 1 to 6 with associated variants of embodiment, is carried out by gluing operations which is dependent on the type of the books or book blocks present. In the case of products from a saddle stitcher, all conventional and specified types of finishings are used.

The type-specific books or book blocks in the case of a sorted or non-sorted sequence can be processed according to the following criteria:

a) In the case of a sorted sequence of the book blocks introduced into the print further processing machine, the fundamental effective composition of the prevailing sequence is checked at least once by a barcode scanner, i.e. it is checked to which job the print products belong, whether these are fundamentally hardcovers (HC) and their variants of embodiment, preferably in the context of above Nos. 1 to 3, or softcovers (SC) and their variants of embodiment, preferably in the context of above Nos. 4 to 5, or thread-bound books (FH) and their variants of embodiment, preferably in the context of above No. 6. Assuming that the individual jobs are introduced into the print further processing machine so as to be pre-sorted or type-specifically in packs, the operation during the handling sequence of the individual print products of the same type remains unchanged.

b) If a fundamental sorting of the print product is specified, it is checked by at least one further barcode scanner or barcode scanner system ahead of the entry into the print further processing machine whether the respective book block within the sequence is present in a uniform manner throughout, or whether individual variants of embodiment derived therefrom are mixed in with the latter. Accordingly, the individual handling sequences along the endsheet feeder, lining strip feeder, cover sheet feeder, are controlled by a central machine control unit based on specific control profiles.

c) In a non-sorted sequence of the book blocks introduced into the print further processing machine, the items of information detected by the barcode scanners travel to a central machine control unit which controls the individual handling sequence, whereby it is readily possible to handle individual type-specific book blocks in an intermittent manner, not only when the latter are fed in isolation, but also when there is an embodiment of a book block for individual processing that is different in terms of type after each cycle. The same considerations apply when this involves the manufacture of different non-sorted print products in a saddle stitcher.

d) This means accordingly that the mixed operation of type-specific book blocks is able to be carried out in a reliable manner in terms of the product in the case of regular or random sequences, as well as in the case of sequences which are arithmetically or geometrically initiated, with or without truncations, as has already been stated.

The barcode scanner system detects the gang-run related facility and those devices and/or apparatuses of the further processing facility in which the difference of the book blocks for the type-specific finishing of the completed products is detected: thus primarily the continuous detection and differentiation of the signatures or signature packs within the preceding formation of 2, 3 and 4-gang runs, so as to guarantee the following dynamic cutting for providing the formation of individual sheets or the book blocks.

Accordingly, this barcode scanner system is already active in a book block infeed unit which is disposed upstream of the print processing machine; the book block then being directed into the endsheet feeder and subsequently into an adhesive binder or saddle stitcher in which the monitoring, controlling and feedback-controlling of the type-specific products or semi-specific product takes place. Thereafter, the barcode scanner system extends its services even further, to the dimensional completion of the products in a downstream edge cutting machine, preferably as a three-knife trimmer marketed under the trade name "InfiniTrim" by the applicant, as a result of which these print products can be continuously cut to the correct dimensions, independently of their specified thicknesses and format sizes. At least the explanations pertaining to the latter can be derived from the homepage and brochures and from EP3285978 B1 or EP3482892 A2 of the applicant, and they collectively form an integral part of this application.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating a printing system for continuously producing multiple gang runs from an endless web for forming individual signatures or signature packs from an endless web, the individual signatures or signature packs being for producing type-specific print products in a downstream print process, the method comprising:

receiving the endless web in a non-folded state, and before cutting the endless web, executing a complementary handling operation to prepare the endless web for a subsequent operation;

cutting the endless web transversely to a running direction to a specified or variable cutting length forming an individual sheet;

transporting the individual sheet to a transfer section while maintaining a specified or continuously re-established mutual spacing from a previous individual sheet or a subsequent individual sheet cut from the endless web;

braking the individual sheet;

performing a first longitudinal fold of the individual sheet or of the individual sheet with at least one of the previous individual sheet or the subsequent individual sheet to form one of the individual signatures or one of the signature packs; and feeding at least one of the individual signatures or the signature packs to an alignment section capable of implementing each the following operations according to a respective configuration of the system:

a) aligning the individual signatures or the signature packs in a 2-gang run for implementing auxiliary gluing in a downstream collation process;

b) aligning the individual signatures or the signature packs in a 3 or 4-gang run for a second longitudinal folding and auxiliary gluing in the downstream collation process;

c) in the 2-gang run, the individual signatures or the signature packs are only deflected in a second longitudinal folding station disposed downstream of a first longitudinal folding station at which the first longitudinal fold was performed; and d) in the 3 or 4-gang run, the individual signatures or the signature packs are additionally folded in a second longitudinal fold at the second longitudinal folding station disposed downstream of the first longitudinal folding station.

2. The method as claimed in claim 1, wherein at least in the 2, 3, or 4-gang run, the method further comprises transversely folding or combining the individual signatures of the signature packs, and/or subsequently longitudinally and transversely folding the individual signatures or the signature packs.

3. The method as claimed in claim 1, wherein executing the complementary handling operation comprises performing at least one longitudinal perforation, applying a fold softening agent with at least one fold-softening nozzle, scoring with at least one scoring wheel on the endless web to establish a formation of at least one of 2, 3, or 4-gang run individual signatures or signature packs.

4. The method as claimed in claim 3, wherein the complementary handling is carried out by an arrangement of three longitudinal perforators, three fold-softening nozzles, and/or by three scoring wheels, the three fold-softening nozzles comprising the at least one fold-softening nozzle, and the three scoring wheels comprising the at least one scoring wheel.

5. The method as claimed in claim 1, wherein the cutting is performed by a dynamic cross cutter, which operates according to a specified or variable cycle and is operatively connected to a specified or variable transport flow and delivers in each case the size of the individual signatures.

6. The method as claimed in claim 1, wherein the printing system comprises at least two longitudinal folding devices configured in coordinating combination with at least three longitudinal perforators, the at last two longitudinal folding devices and the at least three longitudinal perforators are coordinated by way of a superordinate control unit based on a chosen folding diagram specified by a data management system or a barcode, wherein a first longitudinal folding device of the at least two longitudinal folding devices performs the first longitudinal fold, and a second longitudinal folding device of the at least two longitudinal folding devices performs the second longitudinal fold, wherein the at least three longitudinal perforators execute the complementary handling which comprises perforating the endless web.

7. The method as claimed in claim 1, wherein in accordance with the chosen folding diagram, one or two or three longitudinal perforations are implemented in such a manner that:

in the case of one longitudinal perforation the center applies to a 2-gang run, in the case of two longitudinal perforations, the center, or the left web, or the right web, applies to a 3-gang run, and three longitudinal perforations are assigned to the 4-gang run.

8. The method as claimed in claim 1, wherein cutting the endless web comprises successively cutting a plurality of individual sheets from the endless web, the individual sheets comprising the individual sheet, the previous individual sheet, and the subsequent individual sheet, wherein the method further comprises a braking operating comprising passing the individual sheets or a sheet pack of the individual sheets upstream of the first longitudinal folding station through a braking apparatus by way of which the individual sheets or the sheet pack are stopped at an exact point on a detent, the braking operation comprising the braking of the individual sheet;

wherein performing the first longitudinal fold is controlled by way of a superordinate control unit based on a folding diagram designated by a data management system or a barcode and comprises folding the individual sheets or sheet pack individually or collectively to form the individual signatures or the signature packs before feeding the individual signatures of the signature packs to the alignment section, wherein the method further comprises, in the alignment section, aligning the individual signatures or the signature packs to a fixed edge disposed transversely to the transport direction in such a manner that in accordance with the folding diagram the individual signatures or the signature packs in the second longitudinal folding station are deflected by folding rollers according to the 2-gang run, or folded once again according to the 3-gang run and 4-gang run.

9. The method as claimed in claim 1, wherein the individual signatures or the signature packs during the folding process in the second longitudinal folding station impact on a sheet, which is disposed parallel to a second longitudinal folding device, and wherein the individual signatures or the signature packs for forming the second longitudinal fold are directed by a folding air pulse in the direction of folding rollers of the second longitudinal folding device.

10. The method as claimed in claim 1, wherein preconditions for carrying out a change of signatures for a subsequent finishing of the type-specific print products, comprising those from adhesive binding to sewn binding or to saddle stitching, at full machine speed are achieved by switching in a precise signature-specific manner from longitudinal perforation to fold-softening nozzle or scoring wheel.

11. The method as claimed in claim 10, wherein a full machine speed for maximizing a delivery performance is guaranteed by pre-gathering the signatures in the first longitudinal folding station.

12. The method as claimed in claim 1, wherein a cycle-dependent folding of individual signatures so as to form signature packs is directed by a recipe-based main control unit which controls in particular a variable-thickness adjustment of the folding rollers, and a variation of the folding pressure at an air blade.

13. The method as claimed in claim 1, wherein the continual changeover of 2, 3, 4-gang runs is a direct function of a customary paper web width, and wherein the number of gang runs to be processed is correspondingly increased or decreased when the paper web width increases or decreases.

14. The method as claimed in claim 1, wherein in the processing of 2, 3, 4-gang runs, a paper web width of 22.5" is used as the basis, and wherein when doubling to an 8-gang run, the infed paper web width is formed so as to be 2-ply in comparison with the preceding paper web width.

15. The method as claimed in claim 1, wherein in the processing of a paper web which up to the first longitudinal folding station has at least in part been handled as a 2-ply paper web, the following proportions of gang runs are provided:

a) in a 5-gang run, the paper web is divided or folded at a ratio of 3/5 to 2/5;

b) in a 6-gang run, the paper web is present as a 2-ply web at a ratio of 1/1; and c) in a 7-gang run, the paper web is divided or folded at a ratio of 4/7 to 3/7.

16. The method as claimed in claim 14, wherein in a condition where the paper web is widened to double width, the page count processed per operating cycle is doubled.

17. The method as claimed in claim 1, wherein the change of gang run from 2 to 3 and 3 to 4 or in the reverse order takes place by readjusting the intake position of the first longitudinal folding station, and wherein the change of gang run from 2 to 4 or in the reverse order take place seamlessly without readjusting the intake position.

18. The method as claimed in claim 1, wherein the seamless production of type-specific print products down to a run of one is carried out so as to be fit for postage by an automatic and precise signature-specific changeover from longitudinal perforation to fold-softening nozzle.

19. The method as claimed in claim 1, wherein the seamless production of type-specific print products down to a run of one is carried out so as to be fit for postage with a closed spine by a combination of fold-softening nozzle and/or scoring wheel.

20. The method as claimed in claim 1, wherein the envelopes associated with the type-specific print products are produced with a jaw folder by using a scoring wheel.

21. The method as claimed in claim 20, wherein the jaw folder is established by the folding mode according to the 3-gang run, and wherein the jaw folder is folded in the first longitudinal folding station and the sheet associated with the jaw folder is deflected and subsequently collated in a second longitudinal air folding station.

22. The method as claimed in claim 17, wherein the changeover from Z-fold to W-fold takes place automatically and seamlessly or quasi-seamlessly while a facility is in the full running mode.

23. The method as claimed in claim 1, wherein the production of a double-parallel fold in the case of individual signatures or pre-gathered folded signature packs is carried out in the 4-gang run.

24. The method as claimed in claim 1, wherein a production changeover to individual sheets takes place seamlessly by, precisely in the cycle, lifting the sheet detent in the first longitudinal folding station and by suppressing a folding pulse in such a manner that the individual signature is transported through the station and fed to a downstream gathering or collating installation.

25. A method for operating a printing system for a continuous production of a plurality of gang runs from an endless web for forming individual signatures or signature packs, the individual signatures or signature packs being for producing type-specific print products in a downstream process, the method comprising:

receiving the endless web in a non-folded state, and before cutting the endless web, executing complementary handling operations;

cutting the endless web, by way of a specified or variable cutting length to form individual sheets, the cutting being done transversely to a running direction;

transporting the individual sheets to a transfer section while maintaining a specified or continuously re-established mutual spacing between the individual sheets the transfer section comprising a braking apparatus configured to operate so as to correspond to the specified or variable cutting length;

folding the individual sheets downstream of the braking apparatus, by way of at least one longitudinal air folding station or a mechanically operatable folding station, to form folded individual signatures or pre-assembled and folded signature packs; and feeding the folded individual signatures or the pre-assembled and folded signature packs to an alignment section for implementing planned operations; and transferring the folded individual signatures or the pre-assembled and folded signature packs to a print processing machine for executing the downstream process to produce the type-specific print product as a fold-glued and/or stitched brochure at least in a 2-gang run.

26. A method for operating a printing system for a continuous production of multiple gang runs from an endless web for forming individual signatures or signature packs, the individual signatures or signature packs being for producing type-specific print products in a downstream process, the method comprising:

receiving the endless web in a non-folded state, and before cutting the endless web, performing complementary handling operations to the endless web, the complementary handling operations comprising scoring and/or applying fold-softening agents in folding regions;

cross-cutting the endless web by way of a specified or variable cutting length to form individual sheets, the cutting being done transversely to a running direction transporting the individual sheets while maintaining a specified or continuously re-established mutual spacing to a transfer section having a braking apparatus configured to operate so as to correspond to the cutting length;

downstream of the braking apparatus, performing a glue application in the scored and/or fold-softened folding regions, and gathering and subsequently folding the individual sheets in a first longitudinal air folding station to form the individual signatures or signature packs, and downstream of the first longitudinal air folding station, deflecting the individual signatures or signature packs in a second longitudinal air folding station prior to collating and discharging the type-specific print products as finished brochures.

27. The method as claimed in claim 3, wherein in each type of gang run the longitudinal fold is replaced integrally by a transverse fold, or the two types of folds are operated in any arbitrary combination with one another.

28. A printing system for carrying out a method for continuous production of multiple gang runs from an endless web for forming individual signatures or signature packs, the individual signatures of the signature backs being for producing type-specific print products in a downstream device the system comprising:

a perforator, a fold-softening nozzle, or a scoring wheel configured to receive the endless web in a non-longitudinally-folded state and then to perforate, apply a softening agent, or score the endless web;

a cross-cutter configured to cut the endless web, by way of a specified or variable cutting length, to form individual sheets, the cross-cutter being arranged downstream of the perforator, fold-softening nozzle, or the scoring wheel, the cross-cutter being further configured to cut transverse to a running direction;

a conveyor arranged downstream of the cross-cutter and configured transport the individual sheets to a transfer section while maintaining a specified or continually re-established mutual spacing between the individual sheets;

a brake in the transfer section downstream of the, the brake being configured to operate so as to correspond to the specified cutting length;

downstream of the brake, at least one first longitudinal air folding station or a mechanically operatable folding station, each of which are configured to execute a first longitudinal fold the individual sheets to form folded individual signatures or pre-gathered and folded signature packs; and an alignment section configurable to implement the following handling operations:

a) an alignment of the folded individual signatures or folded signature packs in a 2-gang run for implementing auxiliary gluing in a downstream collation process;

b) an alignment of the folded individual signatures or folded signature packs in a 3 and 4-gang run for a second longitudinal folding in a second longitudinal air folding station and auxiliary gluing in the downstream collation process;

c) in a 2-gang run, the individual signatures or the folded signature packs are only deflected in the second longitudinal air folding station disposed downstream of the first longitudinal air folding station or the mechanically operable folding station; and d) in a 3 or 4-gang run, the individual signatures or the folded signature packs are additionally folded in the second longitudinal air folding station disposed downstream of the first longitudinal air folding station.

29. A device for processing print products or book blocks provided by a printing system of claim 28 in an individual or mixed operating mode, the device comprising:

at least one end sheet feeder integrated with the printing system or operating autonomously;

at least one adhesive binder comprising a gluing station; a cover sheet feeder; and a lining station; and at least one barcode scanner system, which is connectable to a main control unit of the system, the device being configured to carry out a type-specific finishing of the print products at least according to the following:

a) a first type-specific finishing of the print products in the adhesive binder lies in that the print products, which in the end sheet feeder integrated in a facility or operating autonomously are provided with an end sheet, in terms of processing are able to be handled by the lining station; or b) a second type-specific finishing of the print products in the adhesive binder by transporting the print products while bypassing the end sheet feeder are able to be machined in the lining station; or c) a third type-specific finishing of the print products in the adhesive binder lies in that the print products transported while bypassing the end sheet feeder are able to be handled in the cover sheet feeder.

30. The device as claimed in claim 29, wherein the barcode scanner system comprises barcode scanners which are configured to operate autonomously or independently from one another, and by way of which the type-specific finishing of the transported print products is able to be detected, and by way of which the type-specific processing at least in the end sheet feeder and at least in the adhesive binder is able to be carried out.

31. The device as claimed in claim 29, wherein the barcode scanner system is replaceable by simple markings, or by a RFID system, or by integration in a workflow system.

32. The device as claimed in claim 29, wherein the first type-specific finishing of the print products forms hardcovers.

33. The device as claimed in claim 29, wherein the second type-specific finishing of the print products forms quasi-hardcovers.

34. The device as claimed in claim 29, wherein the third type-specific finishing of the print products forms softcovers.

35. The device as claimed in claim 29, wherein a fourth type-specific finishing of the print products is a book block from a thread-binding machine.

36. The device as claimed in claim 29, wherein an automatic book block feeding unit which is operatively connected and optionally provided with a further barcode scanner is able to be operated upstream of the end sheet feeder.

37. The device as claimed in claim 29, wherein the allocations of the end sheet, the lining strip and the cover sheet are able to be carried out by gluing operations.

38. The device as claimed in claim 29, wherein the allocation of the lining strip to the hardcover is able to be supplemented by a lining-pressing procedure.

39. The device as claimed in claim 29, wherein parts of the facility that are directed toward detecting and differentiating at least between softcovers, quasi-hardcovers, hardcovers, and the individual processing thereof, are monitored by the barcode scanner system.

40. The device as claimed in claim 29, wherein the adhesive binder has a book block transport system with a closed guide track on which three transport clamps by means of in each case one guide assembly are able to be moved through handling stations that are fastened to a machine frame of the adhesive binder and disposed along the guide track; and wherein the handling stations are composed substantially of a block introduction station, a spine handling station, a glue application station, a glue application check unit, a drying station, at least one lining and lining-pressing station, and at least one cover sheet station.

41. The device as claimed in claim 29, wherein the adhesive binder is equipped with a clamp opening system which is composed of at least one clamp-internal and of at least one clamp-external element; wherein both elements are operatively connected to one another so that opening of the clamp jaws associated with the binder clamps is able to be established; wherein the clamp-external element at a loading location of the print product by a barcode scanner command is able to be actuated by a motorized pressing operation toward the movable clamp-internal element in such a manner that the latter initiates targeted opening of the clamp jaws associated with the binder clamp as a function of the thickness of the print product to be received; wherein this pressing operation in parallel builds up a preferably spring-force related reaction force which is then available as a contact pressure force acting on the book block received in the binder clamp.

42. The device as claimed in claim 41, wherein the contact pressure force is able to be provided by a motorized apparatus of which the implementation is able to be carried out by a facility control unit based on the items of information obtained from the barcode scanner system.

43. The device as claimed in claim 29, wherein the mixed operation of type-specific print products is able to be carried out in the case of regular or random sequences, as well as in the case of sequences which are arithmetically or geometrically initiated, with or without truncations.

44. The device as claimed in claim 29, wherein the type-specific print products are able to be processed in a mixed operation, wherein the following handling operations are able to be carried out in a type-specifically sorted or unsorted sequence;

a) the identification of the type of print product, specifically whether the latter are softcovers, or quasi-softcovers, hardcovers or quasi-hardcovers to be delivered, or whether this is a book block from a thread-binding machine, takes place at least by a barcode scanner at the entrance of the device;

b) the attachment of an endsheet takes place from case to case and individually, or it is established that the attachment thereof has already take place autonomously;

c) the attachment of a lining strip and the pressing thereof takes place from case to case and individually downstream in a lining station;

d) the attachment of a cover sheet takes place from case to case and individually further downstream in a cover sheet feeder.

* * * * *